United States Patent
Burns et al.

(10) Patent No.: US 6,953,411 B2
(45) Date of Patent: *Oct. 11, 2005

(54) ELECTRONICALLY-TUNED HYDROMECHANICAL COUPLING

(75) Inventors: Timothy M. Burns, Jordan, NY (US); William E. Smith, Liverpool, NY (US); Lee Arnold, Syracuse, NY (US); Sankar K. Mohan, Jamesville, NY (US); Jerry Stewart, Verona, NY (US)

(73) Assignee: Magna Drivetrain of America, Inc., Troy, MI (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/744,646

(22) Filed: Dec. 22, 2003

(65) Prior Publication Data

US 2004/0149505 A1 Aug. 5, 2004

Related U.S. Application Data

(63) Continuation-in-part of application No. 10/672,828, filed on Sep. 26, 2003, now Pat. No. 6,814,681, which is a continuation of application No. 10/083,941, filed on Feb. 27, 2002, now Pat. No. 6,626,787.
(60) Provisional application No. 60/280,787, filed on Apr. 2, 2001.

(51) Int. Cl.[7] .................. F16H 48/30; F16H 31/00; F16H 48/06

(52) U.S. Cl. .................. 475/231; 475/88; 475/117; 192/103 F

(58) Field of Search .................. 475/221, 116, 475/117, 88, 231, 118; 192/103 F, 35, 85 AA

(56) References Cited

U.S. PATENT DOCUMENTS

| | | | |
|---|---|---|---|
| 4,031,780 | A | 6/1977 | Dolan et al. |
| 4,650,028 | A | 3/1987 | Eastman et al. |
| 4,840,247 | A | 6/1989 | Kashihara et al. |
| 4,866,624 | A | 9/1989 | Nishikawa et al. |
| 4,895,236 | A | 1/1990 | Sakakibara et al. |
| 4,950,214 | A | 8/1990 | Botterill |

(Continued)

FOREIGN PATENT DOCUMENTS

JP 62231821 A 10/1987

Primary Examiner—Tisha Lewis
(74) Attorney, Agent, or Firm—Harness, Dickey & Pierce P.L.C.

(57) ABSTRACT

A drive axle assembly for use in an all-wheel drive vehicle having a first hydraulic coupling operable to automatically transfer drive torque to a secondary driveline in response to slip of the primary driveline and a second hydraulic coupling operable to bias torque and limit slip between the wheels of the secondary driveline. The first hydraulic coupling is electronically-controlled.

21 Claims, 20 Drawing Sheets

U.S. PATENT DOCUMENTS

| | | | |
|---|---|---|---|
| 5,083,635 A | 1/1992 | Tashiro | |
| 5,086,867 A | 2/1992 | Hirota et al. | |
| 5,135,071 A | 8/1992 | Shibahata et al. | |
| 5,148,903 A | 9/1992 | Kobayashi et al. | |
| 5,234,091 A * | 8/1993 | Kobayashi et al. | 192/85 CA |
| 5,301,769 A | 4/1994 | Weiss | |
| 5,310,388 A | 5/1994 | Okcuoglu et al. | |
| 5,353,889 A | 10/1994 | Hamada | |
| 5,366,419 A | 11/1994 | Oda | |
| 5,411,447 A | 5/1995 | Frost | |
| 5,595,214 A | 1/1997 | Shaffer et al. | |
| 5,690,201 A | 11/1997 | Gassmann | |
| 5,699,888 A | 12/1997 | Showalter | |
| 5,827,145 A | 10/1998 | Okcuoglu | |
| 5,904,632 A | 5/1999 | Brown | |
| 5,910,064 A | 6/1999 | Kuroki | |
| 5,938,556 A | 8/1999 | Lowell | |
| 5,964,126 A | 10/1999 | Okcuoglu | |
| 5,967,285 A | 10/1999 | Mohan et al. | |
| 6,009,968 A | 1/2000 | Kouno | |
| 6,041,903 A | 3/2000 | Burns et al. | |
| 6,076,646 A | 6/2000 | Burns | |
| 6,095,939 A | 8/2000 | Burns et al. | |
| 6,112,874 A | 9/2000 | Kopp et al. | |
| 6,142,905 A | 11/2000 | Brown | |
| 6,145,644 A | 11/2000 | Mohan et al. | |
| 6,155,947 A | 12/2000 | Lowell | |
| 6,158,303 A | 12/2000 | Khiraishi et al. | |
| 6,186,258 B1 | 2/2001 | Deutschel et al. | |
| 6,296,590 B1 | 10/2001 | Gassmann | |
| 6,315,097 B1 | 11/2001 | Burns | |
| 6,318,532 B1 | 11/2001 | Gassmann | |
| 6,378,677 B1 | 4/2002 | Kuroda et al. | |
| 6,398,686 B1 | 6/2002 | Irwin | |
| 6,413,182 B1 | 7/2002 | Yates, III et al. | |
| 6,578,654 B2 | 6/2003 | Porter | |
| 6,578,692 B2 | 6/2003 | Porter | |
| 6,626,787 B2 | 9/2003 | Porter | |
| 6,725,989 B1 | 4/2004 | Krisher et al. | |
| 2001/0025734 A1 | 10/2001 | Nishida et al. | |

* cited by examiner

ELECTRONICALLY-TUNED HYDROMECHANICAL COUPLING

CROSS-REFERENCE TO RELATED APPLICATIONS

This application is a continuation-in-part of U.S. application Ser. No. 10/672,828, filed on Sep. 26, 2003, now U.S. Pat. No. 6,814,681 which is a continuation of U.S. Ser. No. 10/083,941 filed on Feb. 27, 2002, now U.S. Pat. No. 6,626,787 and which claims the benefit of U.S. Provisional Application Ser. No. 60/280,787, filed Apr. 2, 2001.

FIELD OF THE INVENTION

The present invention relates generally to electronically-controlled hydraulic couplings for use in motor vehicle driveline applications for limiting slip and transferring torque between rotary members.

BACKGROUND OF THE INVENTION

In all-wheel drive vehicles, it is common to have a secondary drive axle that automatically receives drive torque from the drivetrain in response to lost traction at the primary drive axle. In such secondary drive axles, it is known to provide a pair of clutch assemblies connecting each axleshaft to a prop shaft that is driven by the drivetrain. For example, U.S. Pat. No. 4,650,028 discloses a secondary drive axle equipped with a pair of viscous couplings. In addition, U.S. Pat. Nos. 5,964,126, 6,095,939 and 6,155,947 each disclose secondary drive axles equipped with a pair of pump-actuated multi-plate clutch assemblies. In contrast to these passively-controlled secondary drive axles, U.S. Pat. No. 5,699,888 teaches of a secondary drive axle having a pair of multi-plate clutches that are actuated by electromagnetic actuators that are controlled by an electronic control system.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY OF THE INVENTION

It is an objective of the present invention to provide an electronically-controlled hydromechanical coupling for use in motor vehicle driveline applications for adaptively coupling a pair of rotary members to limit speed differentiation and transfer drive torque therebetween.

It is a further objective of the present invention to integrate the electronically-controlled hydromechanical coupling into a traction control system for adaptively controlling torque transfer in response to detection of certain vehicle operating characteristics.

In achieving these and other objectives, the hydromechanical coupling includes a multi-plate clutch assembly operably connecting a pair of rotary members, an actuator assembly for actuating the clutch assembly, and a fluid control system operable to control actuation of the actuator assembly. The actuator assembly includes a hydraulic pump and a piston mounted in a piston chamber for movement relative to the multi-plate clutch assembly. The fluid control system regulates the fluid pressure with the piston chamber and provides continuous lubrication flow for cooling the clutch assembly. In particular, an electronically-controlled flow control valve is in communication with the piston chamber and is controlled by a traction control system that monitors and responds to certain vehicle operating conditions. Based on a predefined control strategy, the traction control system generates and sends control signals to the flow control valve for controlling the fluid pressure in the piston chamber which, in turn, controls engagement of the clutch assembly.

In accordance with one preferred embodiment, the flow control valve is a dump valve for quick release of fluid pressure in the piston chamber so as to release engagement of the clutch assembly during occurrence of a braking condition, an over-pressure condition or an over-temperature condition.

In accordance with a second preferred embodiment, the flow control valve is a throttle control valve that can be modulated to accommodate variable control of the torque transfer characteristic.

In accordance with a third preferred embodiment, a second control valve is provided to control the delivery of fluid pressure to an auxiliary torque transfer mechanism and which uses the fluid control system associated with the first control valve.

In accordance with a further preferred embodiment, a preemptive locking feature is provided for supplying high pressure fluid to the piston chamber from an auxiliary pressure source.

BRIEF DESCRIPTION OF THE DRAWINGS

Further objectives, features and advantages of the present invention will become readily apparent from the following detailed specification and the appended claims which, in conjunction with the drawings, set forth the best mode now contemplated for carrying out the invention. Referring to the drawings:

FIGS. 19 through 22 are schematic illustrations of alternative power transfer assemblies for use in drivetrain applications equipped with

DETAILED DESCRIPTION OF THE PREFERRED EMBODIMENTS

In general, the present invention is directed to a hydromechanical limited slip and torque transfer device, hereinafter referred to as a drive axle assembly, for use in connecting the drivetrain to a pair of axleshafts associated with a secondary driveline of an all-wheel drive vehicle. However, the drive axle assembly can also find application in other driveline applications including, but not limited to, limited slip differentials of the type used in full-time transfer cases and front-wheel drive transaxles. Furthermore, this invention advances the technology in the field of hydraulically-actuated couplings of the type requiring pressure relief and thermal unloading to prevent damage to the driveline components.

Figure 1:
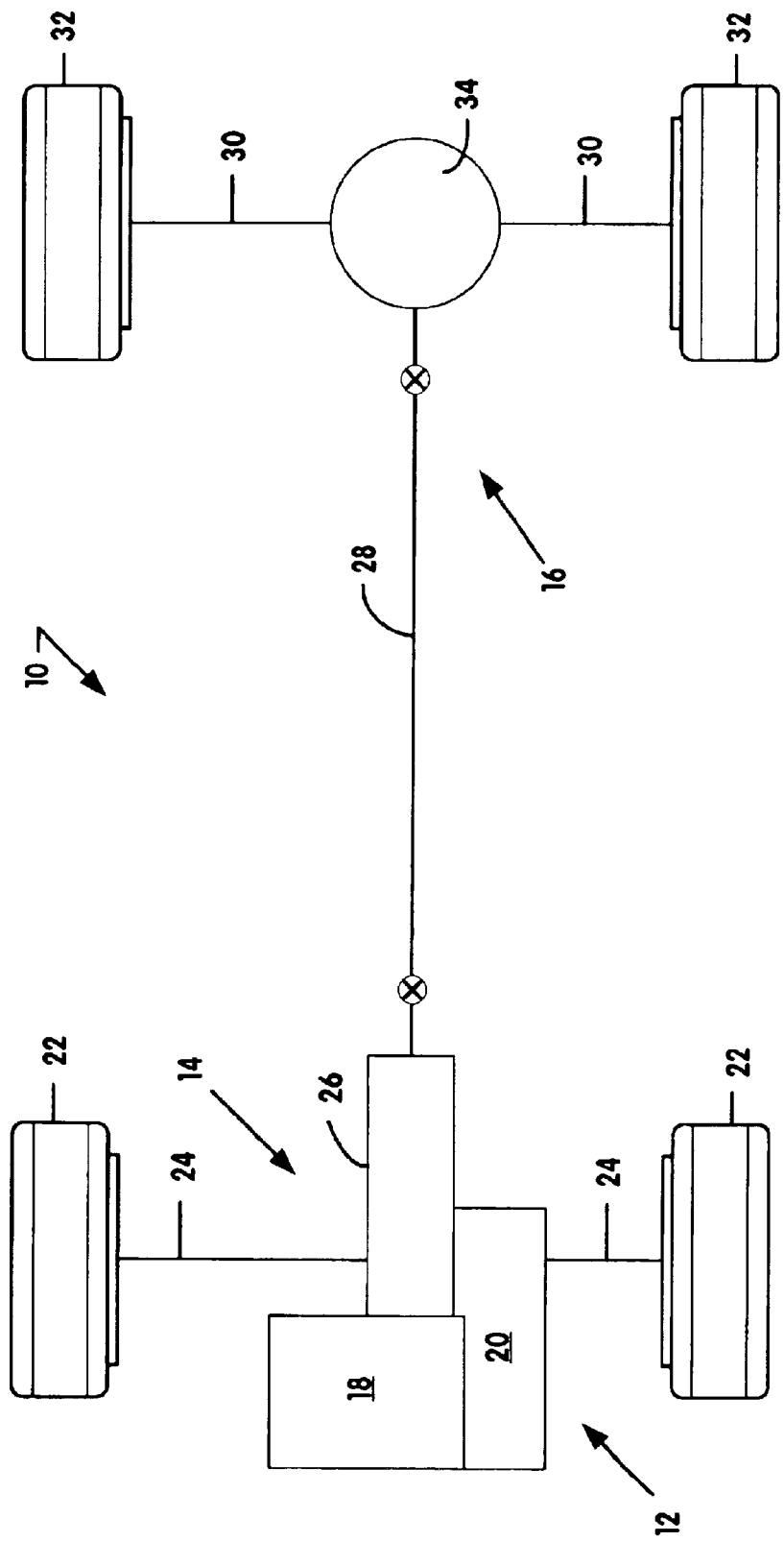
FIG. 1 is a schematic view of a motor vehicle drivetrain equipped with a secondary drive axle assembly constructed in accordance with the present invention.
Figure 2:
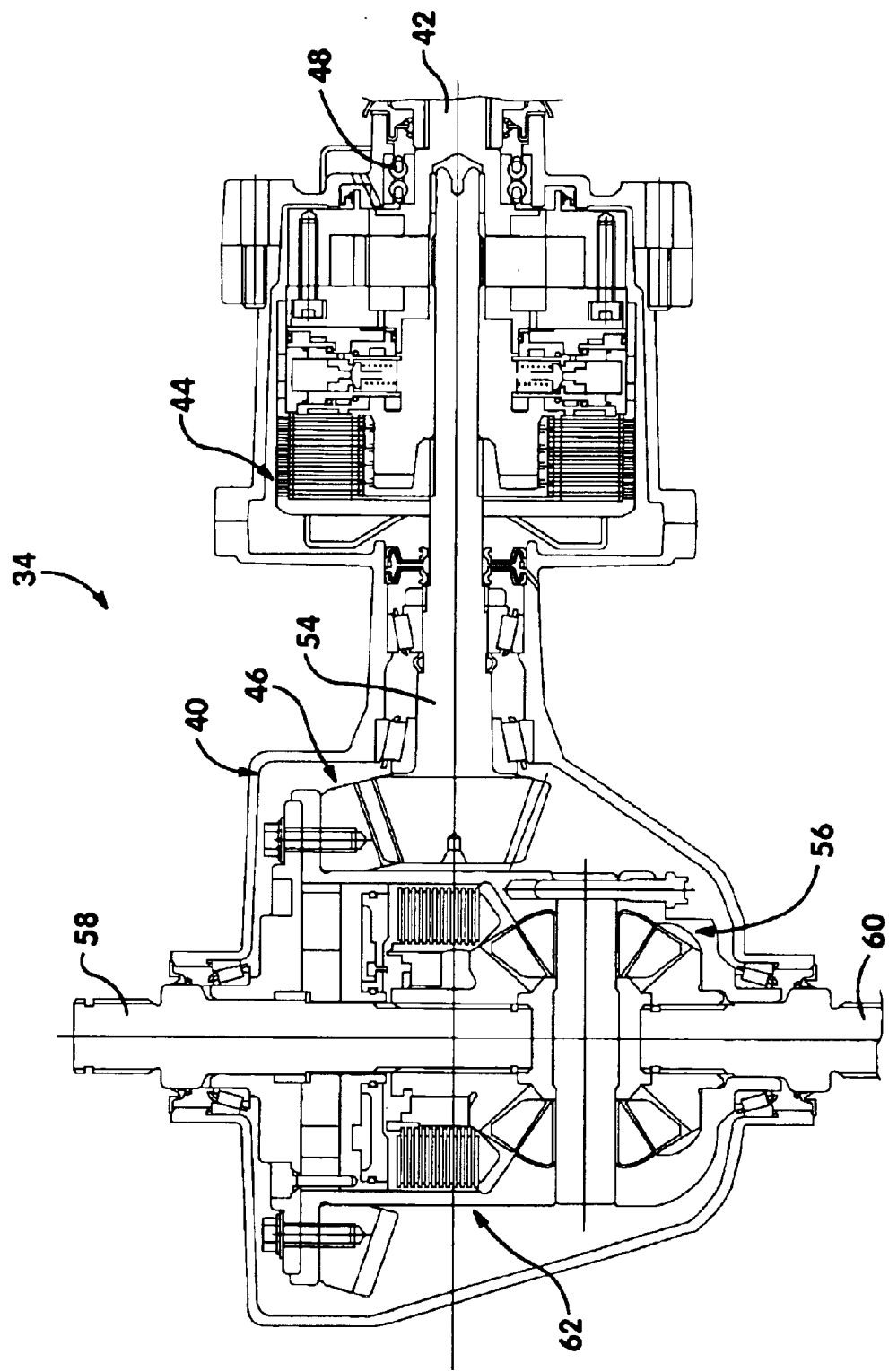
FIG. 2 is a sectional view of the secondary drive axle assembly of the present invention.
Figure 3:
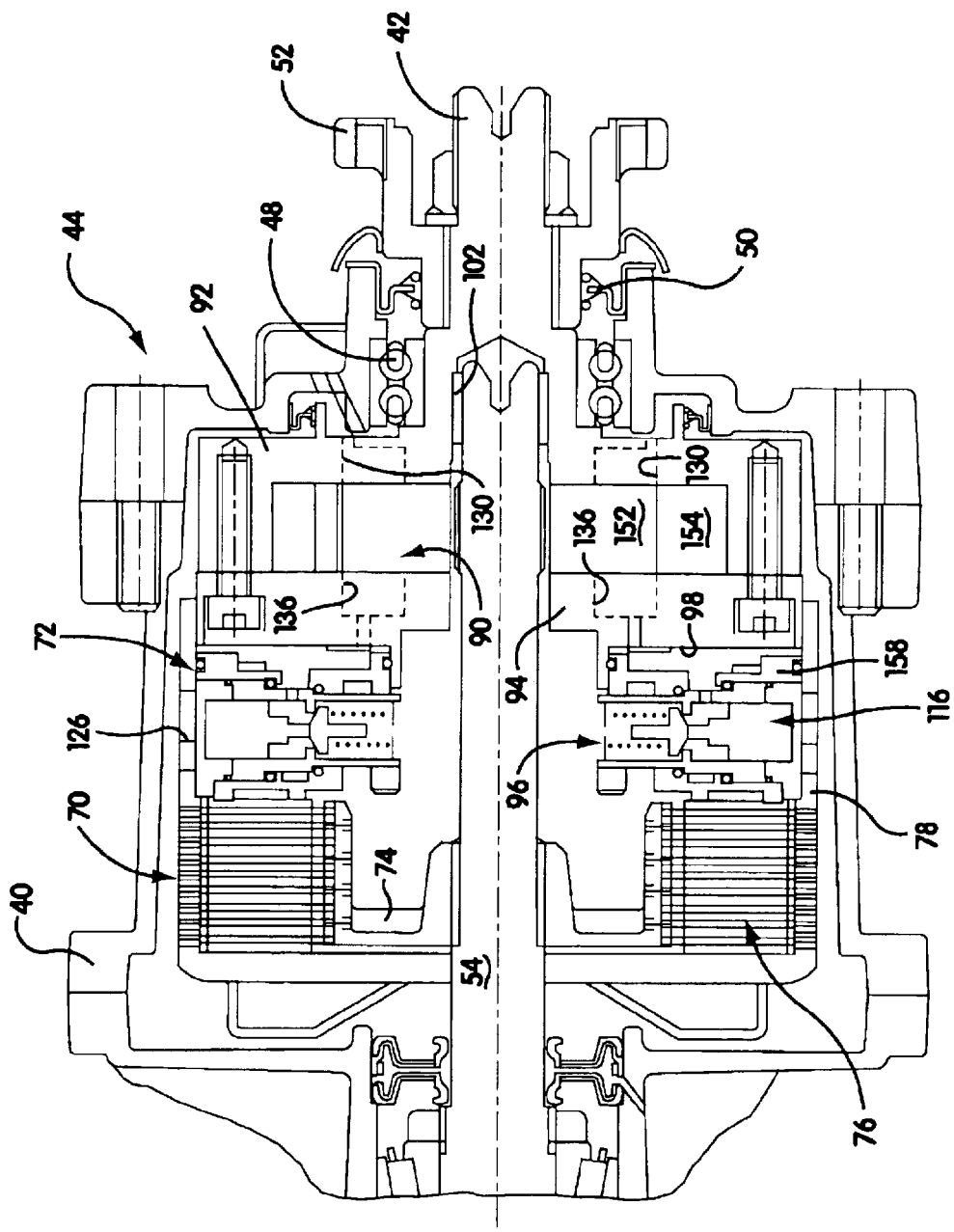
FIG. 3 is a sectional view of an on-demand hydraulic coupling associated with the secondary drive axle assembly.
Figure 4:
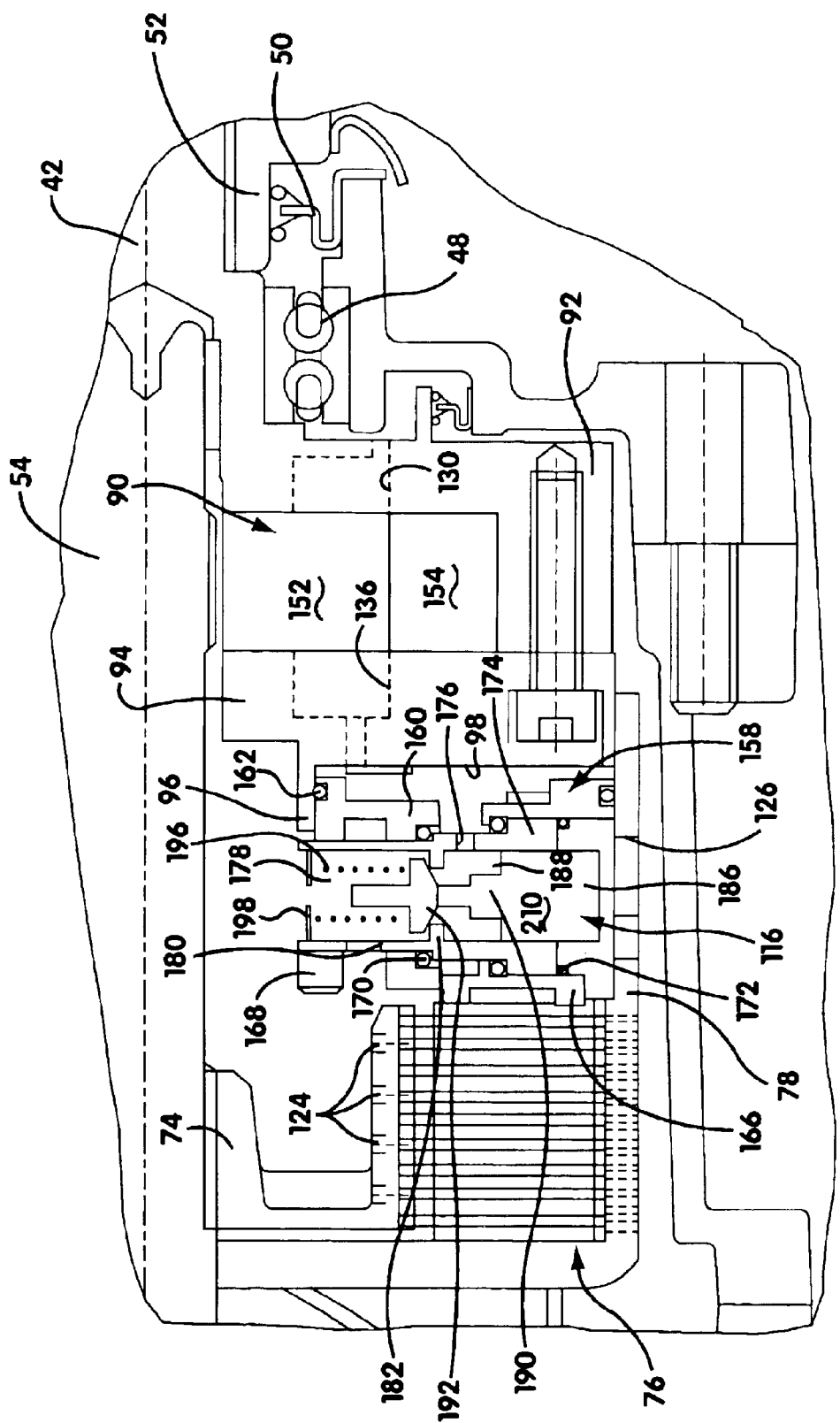
FIG. 4 is an enlarged partial view taken from FIG. 3 showing components of the hydraulic coupling in greater detail.

With reference to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) to a pair of wheels 22 associated with primary driveline 14. Primary driveline 14 further includes a pair of halfshafts 24 connecting wheels 22 to a differential assembly (not shown) associated with transaxle 20. Secondary driveline 16 includes a power take-off unit (PTU) 26 driven by transaxle 20, a prop shaft 28 driven by PTU 26, a pair of axleshafts 30 connected to a pair of wheels 32, and a drive axle assembly 34 operable to transfer drive torque from propshaft 28 to one or both axleshafts 30.

Referring to FIGS. 2 through 6, the components associated with drive axle assembly 34 will be now detailed. Drive axle assembly 34 includes a multi-piece housing 40, an input shaft 42, a first hydraulic coupling 44, and a rear differential module 46. Input shaft 42 is rotatably supported in housing 40 by a bearing assembly 48 and sealed relative thereto via a seal assembly 50. A yoke 52 is secured to input shaft 42 and is adapted for connection to propshaft 28. Drive module 46 includes a pinion shaft 54, a bevel-type differential gearset 56, a pair of output shafts 58 and 60 adapted for connection to axleshafts 30, and a second hydraulic coupling 62. In operation, first hydraulic coupling 44 is operable to transfer drive torque from input shaft 42 to pinion shaft 54 in response to excessive interaxle speed differentiation between propshaft 28 and differential gearset 56. Second hydraulic coupling 62 is operable to limit intra-axle slip in response to excessive speed differentiation between output shafts 58 and 60.

First hydraulic coupling 44 includes a transfer clutch 70 and a clutch actuator 72. Transfer clutch 70 is a multi-plate friction clutch assembly including a clutch hub 74 fixed (i.e., splined) to pinion shaft 54 and a clutch pack 76 of interleaved inner and outer clutch plates that are respectively splined to hub 74 and a clutch drum 78. Clutch actuator 72 includes a fluid pump 90 disposed in a pump chamber formed between and end plate 92 and a piston housing 94, and a piston assembly 96 retained in an annular piston chamber 98 formed in piston housing 94. Clutch drum 78 is fixed (i.e., welded) to piston housing 94. As seen, a bearing assembly 102 supports end plate 92 for rotation relative to input shaft 42.

Piston assembly 96 is supported for axial sliding movement in piston chamber 98 for applying a compressive clutch engagement force on clutch pack 76, thereby transferring drive torque and limiting relative rotation between input shaft 42 and pinion shaft 54. The amount of torque transferred is progressive and is proportional to the magnitude of the clutch engagement force exerted by piston assembly 96 on clutch pack 76 which, in turn, is a function of the fluid pressure within piston chamber 98. Moreover, the fluid pressure generated by pump 90 and delivered to piston chamber 98 is largely a function of the speed differential between propshaft 28 and pinion shaft 54.

Figure 5:
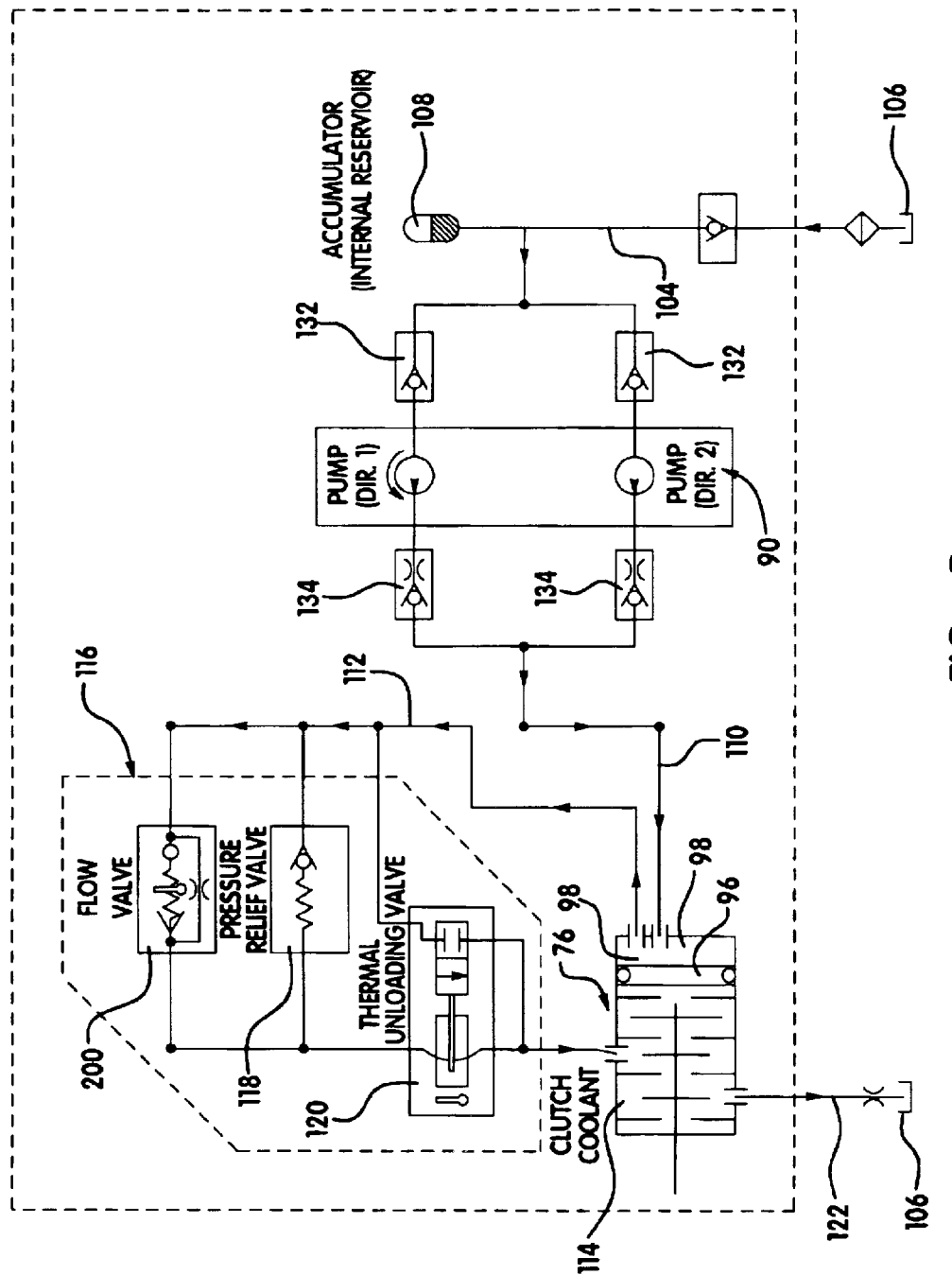
FIG. 5 is a schematic diagram illustrating a hydraulic control circuit associated with the on-demand hydraulic coupling shown in FIG. 3.

With particular reference to FIG. 5, a fluid distribution and valving arrangement is shown for controlling the delivery of fluid to piston chamber 98. The fluid distribution system includes a first flow path 104 for supplying hydraulic fluid from a sump 106 to an inlet reservoir 108 located at the inlet or suction side of fluid pump 90, and a second flow path 110 for supplying fluid from the discharge or outlet side of pump 90 to piston chamber 98. A third flow path 112 extends through piston assembly 96 for venting fluid from piston chamber 98 into a clutch chamber 114 in close proximity to clutch pack 76. A multi-function control valve 116 is located in the third flow path 112 and forms part of piston assembly 96. Control valve 116 provides at least two distinct functional modes of operation. The first mode, hereinafter referred to as its pressure relief function, is schematically illustrated by a pressure relief valve 118. The second mode of operation, hereinafter referred to as its thermal unload function, is schematically indicated by a thermal unload valve 120. With each function, fluid is discharged through piston assembly 96 from piston chamber 98 into clutch chamber 114 for cooling clutch pack 76 and is then returned to sump 106 via a fourth flow path 122. According to the structure shown, lubrication slots 124 formed in hub 74 and exhaust ports 126 formed in drum 78 define fourth flow path 122.

First flow path 104 is defined by a pair of inlet ports 130 formed through first end plate 92. A one-way check valve 132 is provided for selectively opening and closing each of inlet ports 130. Specifically, one-way check valves move between "open" and "closed" positions in response to the direction of pumping action generated by fluid pump 90. Rotation of the pump components in a first direction acts to open one of check valves 132 and to close the other for permitting fluid to be drawn from sump 106 into inlet reservoir 108. The opposite occurs in the case of pumping in the reverse rotary direction, thereby assuring bi-directional operation of pump 90. Check valves 132 are preferably reed-type valves mounted on rivets secured to end plate 92. Check valves 132 are of the normally-closed type to maintain fluid within inlet reservoir 108.

A valving arrangement associated with second flow path 110 includes a second pair of one-way check valves 134 that are located in a pair of flow passages 136 formed in piston housing 94 between the outlet of pump 88 and piston chamber 98. As before, the direction of pumping action establishes which of check valves 134 is in its "open" position and which is in its "closed" position to deliver pump pressure to piston chamber 98. Upon cessation of pumping action, both check valves 134 return to their closed position to maintain fluid pressure in piston chamber 98. Thus, check valves 134 are also of the normally-closed variety.

As noted, fluid pump 90 is operable for pumping hydraulic fluid into piston chamber 98 to actuate transfer clutch 70. Fluid pump 90 is bi-directional and is capable of pumping fluid at a rate proportional to speed differential between its pump components. In this regard, pump 90 is shown as a gerotor pump assembly having a pump ring 152 that is fixed (i.e., keyed or splined) to pinion shaft 54, and an eccentric stator ring 154 that is retained in an eccentric chamber formed in end plate 92. Pump ring 152 has a plurality of external lobes that rotate concentrically relative to pinion shaft 54 about a common rotational axis. Stator ring 154 includes a plurality of internal lobes and has an outer circumferential edge surface that is journally supported within a circular internal bore formed in end plate 92. The internal bore is offset from the rotational axis such that, due to meshing of internal lobes of stator ring 154 with external lobes of pump ring 152, relative rotation between pump ring 152 and eccentric stator ring 154 causes eccentric rotation of stator ring 154. It will be understood that fluid pump 98 can be any type of mechanical pump capable of generating a fluid pumping action in response to a speed differential.

Piston assembly 96 is shown to include a piston 158 and control valve 116. Piston 158 includes a radial web segment 160 sealed by seal ring 162 for movement relative to piston housing 94. Piston 158 further includes one or more circumferential rim segments 166 extending from web segment 160 and which engages clutch pack 76. Piston 158 further defines a cup segment 168 within which control valve 116 is retained. Seal rings 170 are provided to seal control valve 116 relative to cup segment 168 and a circlip 172 is provided to retain control valve 116 in cup segment 168. Control valve 116 includes a tubular housing 174 defining a series of inlet ports 176 and a valve chamber 178 having a series of outlet ports 180. Inlet ports 176 and valve chamber 178 are delineated by a rim section 182 having a central valve aperture formed therethrough. A thermal actuator 186 is retained in pressure chamber 188 of housing 174 and includes a post segment 190. A head segment of a valve member 192 is seated against the valve aperture and engages the terminal end of post segment 190. A spring 196 mounted between an end cap 198 and valve member 192 is operable to bias valve member 192 against the seat surface defined by the valve aperture for normally preventing fluid flow from inlet ports 176 to outlet ports 180. Control valve 116 is arranged such that inlet ports 176 communicate with piston chamber 98 such that valve member 192 is directly exposed to the fluid pressure in piston chamber 98.

Hydraulic coupling 72 includes a flow regulator 200 which is operable for setting the predetermined minimum pressure level within piston chamber 98 at which transfer clutch 70 is initially actuated and which is further operable to compensate for temperature gradients caused during heating of the hydraulic fluid. Preferably, flow regulator 200 is a reed-type valve member secured to piston assembly 96 such that its terminal end is normally maintained in an "open" position displaced from a by-pass port 202 formed through piston 158 for permitting by-pass fluid flow from piston chamber 94 to clutch chamber 114. During low-speed relative rotation, the pumping action of fluid pump 90 causes fluid to be discharged from piston chamber 94 through the by-pass port into clutch chamber 114. Flow regulator 200 is preferably a bimetallic valve element made of a laminated pair of dissimilar metallic strips having different thermal coefficients of expansion. As such, the terminal end of the valve element moves relative to its corresponding by-pass port regardless of changes in the viscosity of the hydraulic fluid caused by temperature changes. This thermal compensation feature can be provided by one or more bimetallic valves. However, once the fluid in piston chamber 98 reaching its predetermined pressure level, the terminal end of the bimetallic valve element will move to a "closed" position for inhibiting subsequent fluid flow through the by-pass port. This flow restriction causes a substantial increase in the fluid pressure within piston chamber 98 which, in turn, causes piston 158 to move and exert a large engagement force on clutch pack 86. A bleed slot (not shown) is formed in one of the by-pass port or bimetallic valve element and permits a small amount of bleed flow even when flow regulator 200 is in its closed position for gradually disengaging transfer clutch 70 when fluid pump 90 is inactive.

The pressure relief function of control valve 116 occurs when the fluid pressure in piston chamber 98 is greater than that required to close bimetallic flow regulator 200 but less than a predetermined maximum value. In this pressure range, the bias of spring 196 is adequate to maintain valve member 192 seated against the aperture such that fluid is prevented from flowing from piston chamber 94 through outlet ports 180. However, when the fluid pressure in piston chamber 98 exceeds this maximum value, valve member 192 is forced to move in opposition to the biasing of spring 196. As such, fluid in piston chamber 98 is permitted to flow through the aperture into valve chamber 178 from where it is discharged from outlet ports 180. The fluid discharged from outlet ports 180 circulates in clutch chamber 114 to cool clutch pack 76 and is directed to flow across actuator section 210 of thermal actuator 186 prior to discharge to sump 106 through exhaust ports 126 in drum 78. Use of this pressure relief function torque limits hydraulic coupling 44 and prevents damage thereto.

The thermal unload function is actuated when the fluid temperature detected by actuator section 210 of thermal actuator 186 exceeds a predetermined maximum value. In such an instance, post segment 190 moves from its retracted position shown to an extended position for causing valve member 192 to move away from seated engagement against aperture (or maintain valve member 192 in its displaced position during pressure relief) and permit fluid in pressure chamber 98 to vent into clutch chamber 114, thereby disengaging transfer clutch 70. Once piston chamber 98 has been unloaded, the fluid and thermal actuator 186 will eventually cool to a temperature below the predetermined value, whereby post segment 190 will return to its retracted position for resetting the thermal unload function. Thermal actuator 186 is of a type manufactured by Therm-Omega Tech of Warminster, Pa. or Standard-Thomson of Waltham, Mass.

Figure 6:
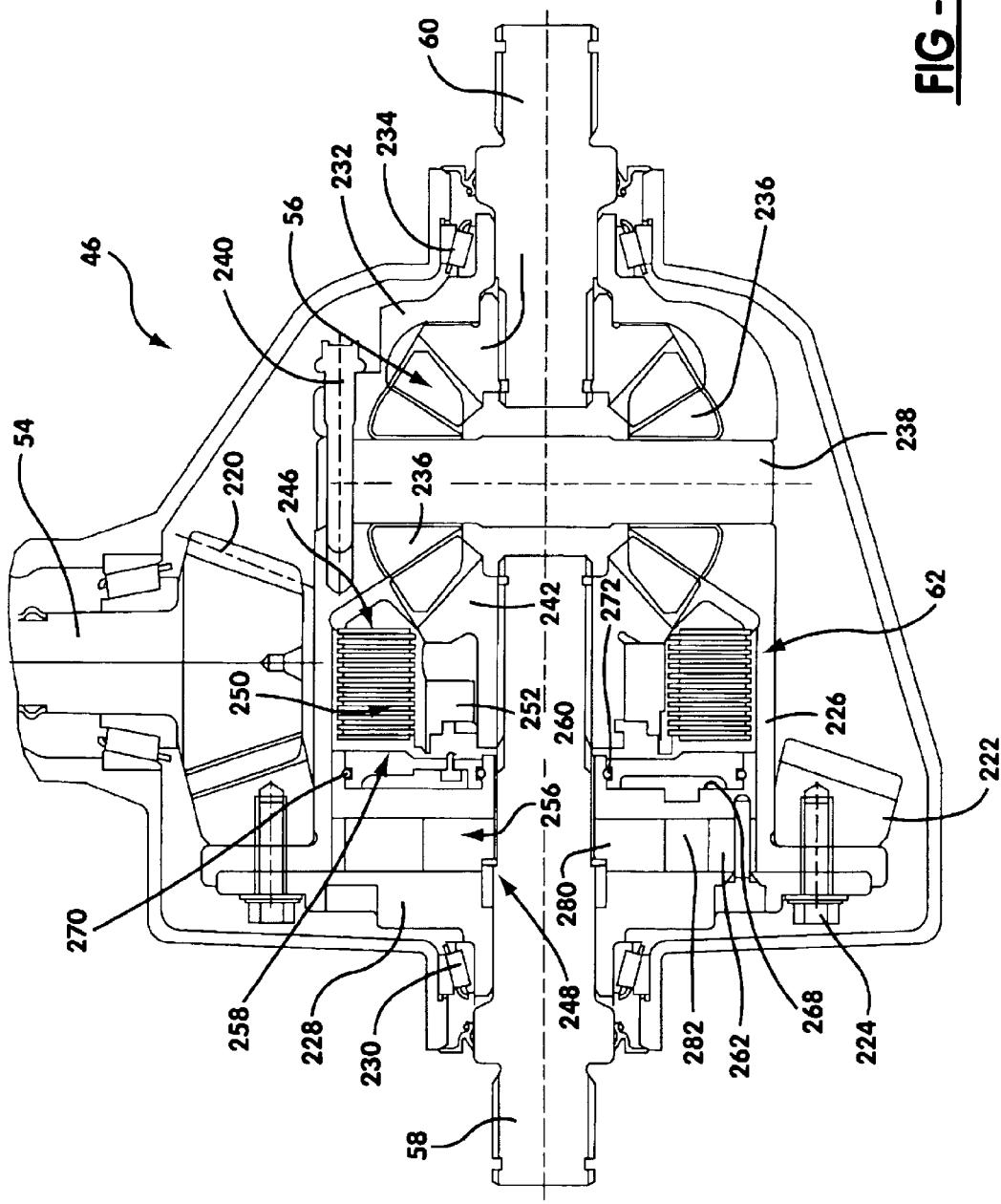
FIG. 6 is a sectional view of a differential drive module associated with the secondary drive axle of the present invention.
Figure 7:
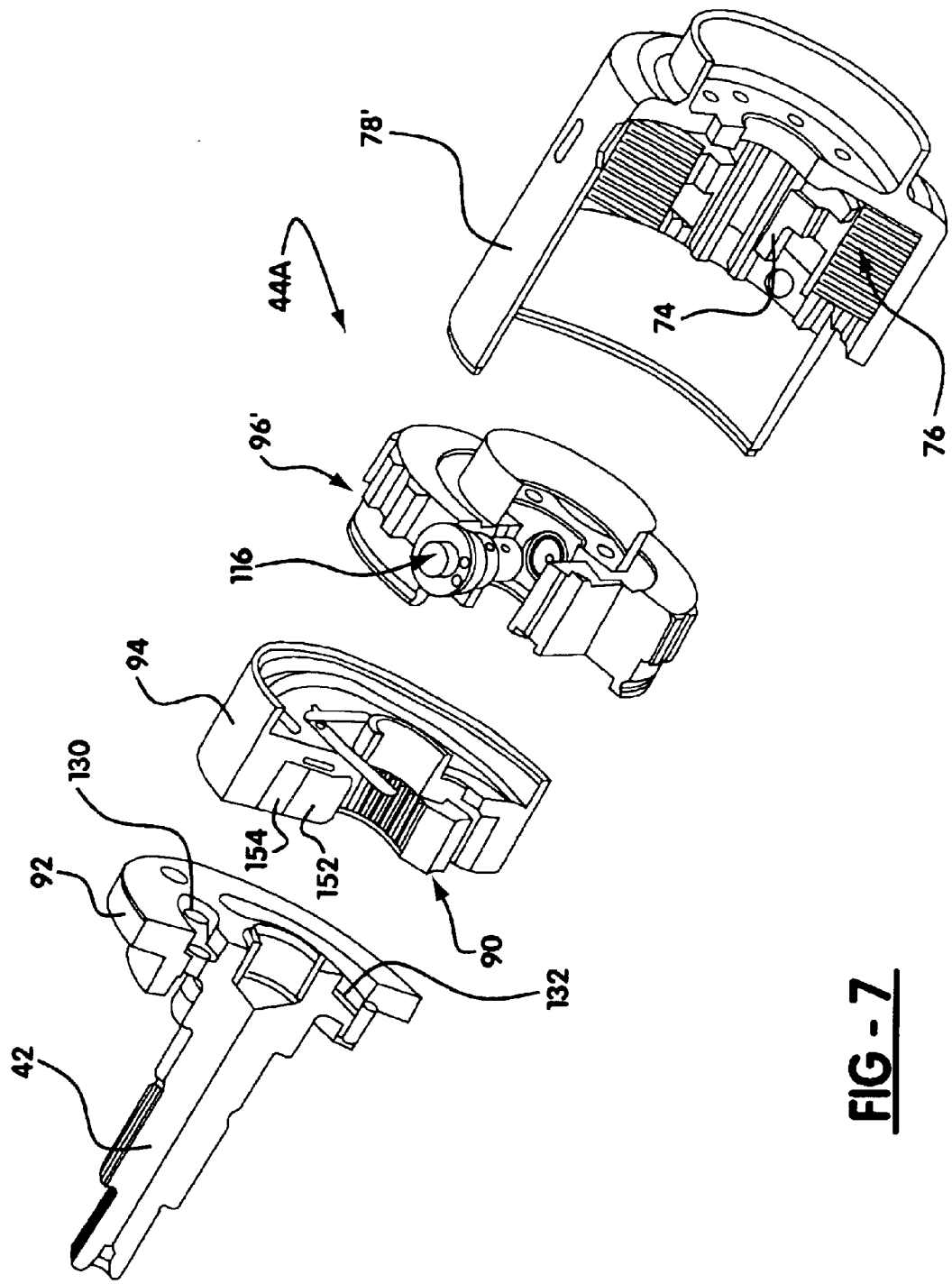
FIGS. 7 through 10 are various exploded and sectional perspective views of a slightly modified version of the on-demand hydraulic coupling.
Figure 8:
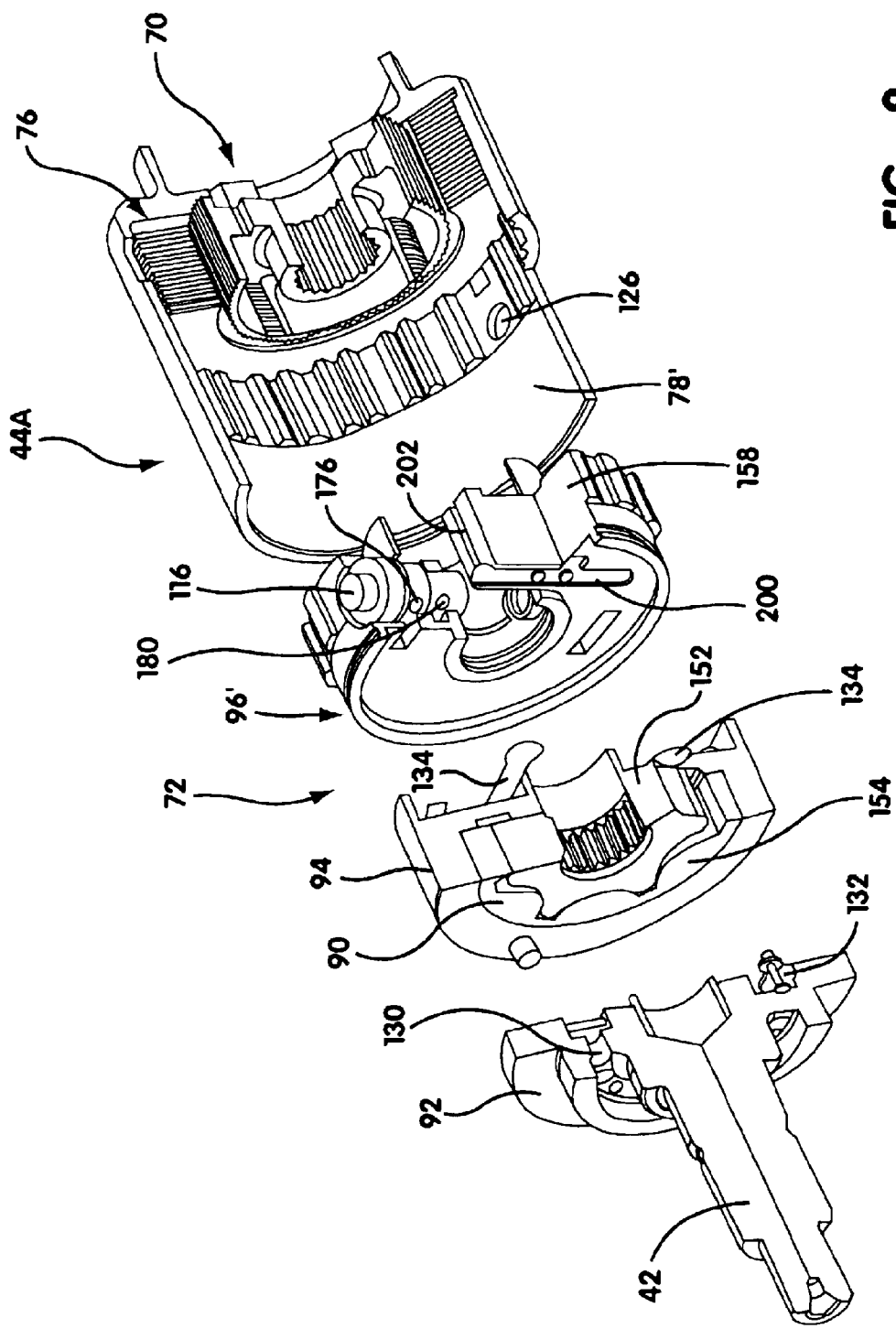
Figure 9:
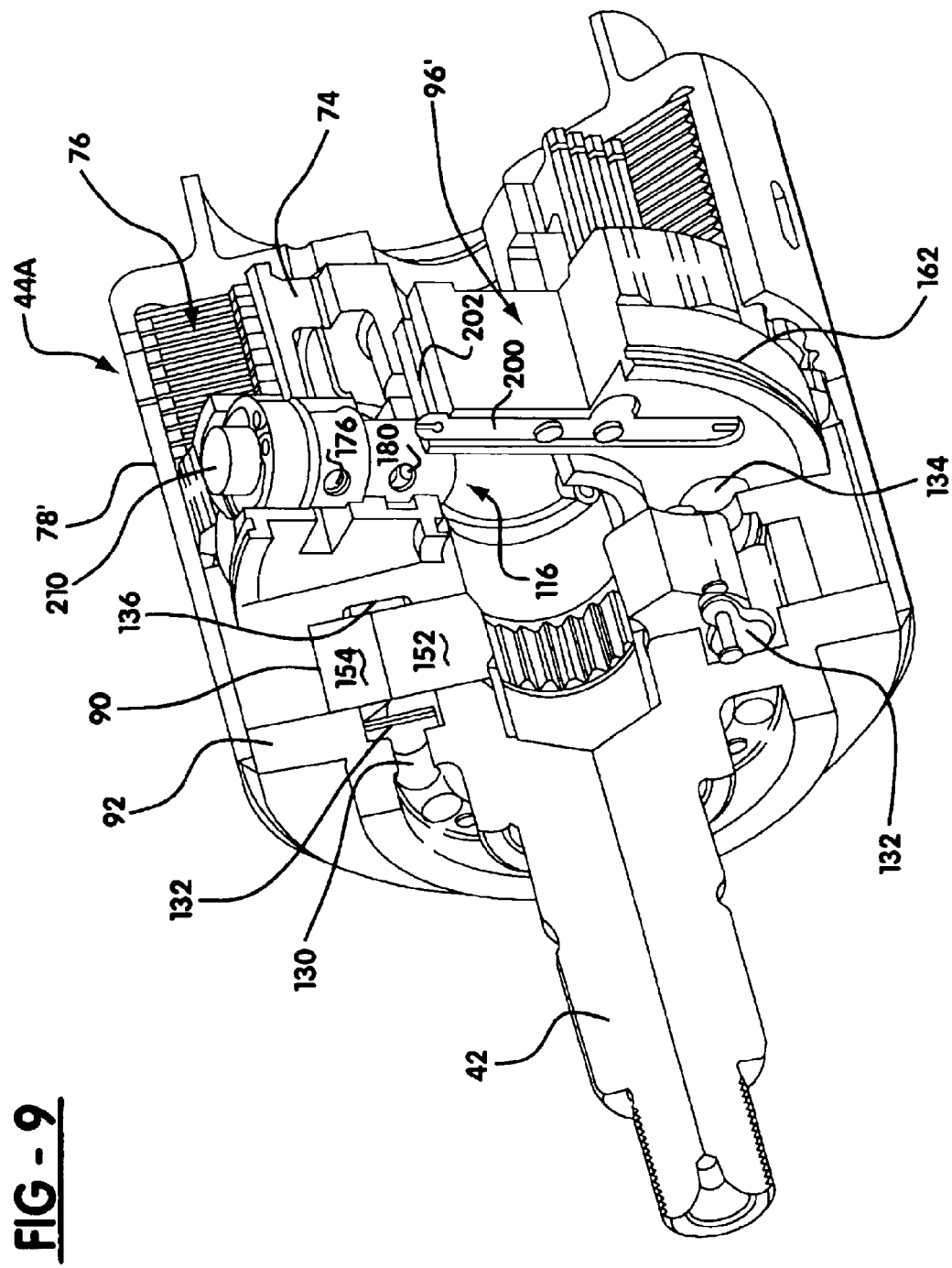
Figure 10:
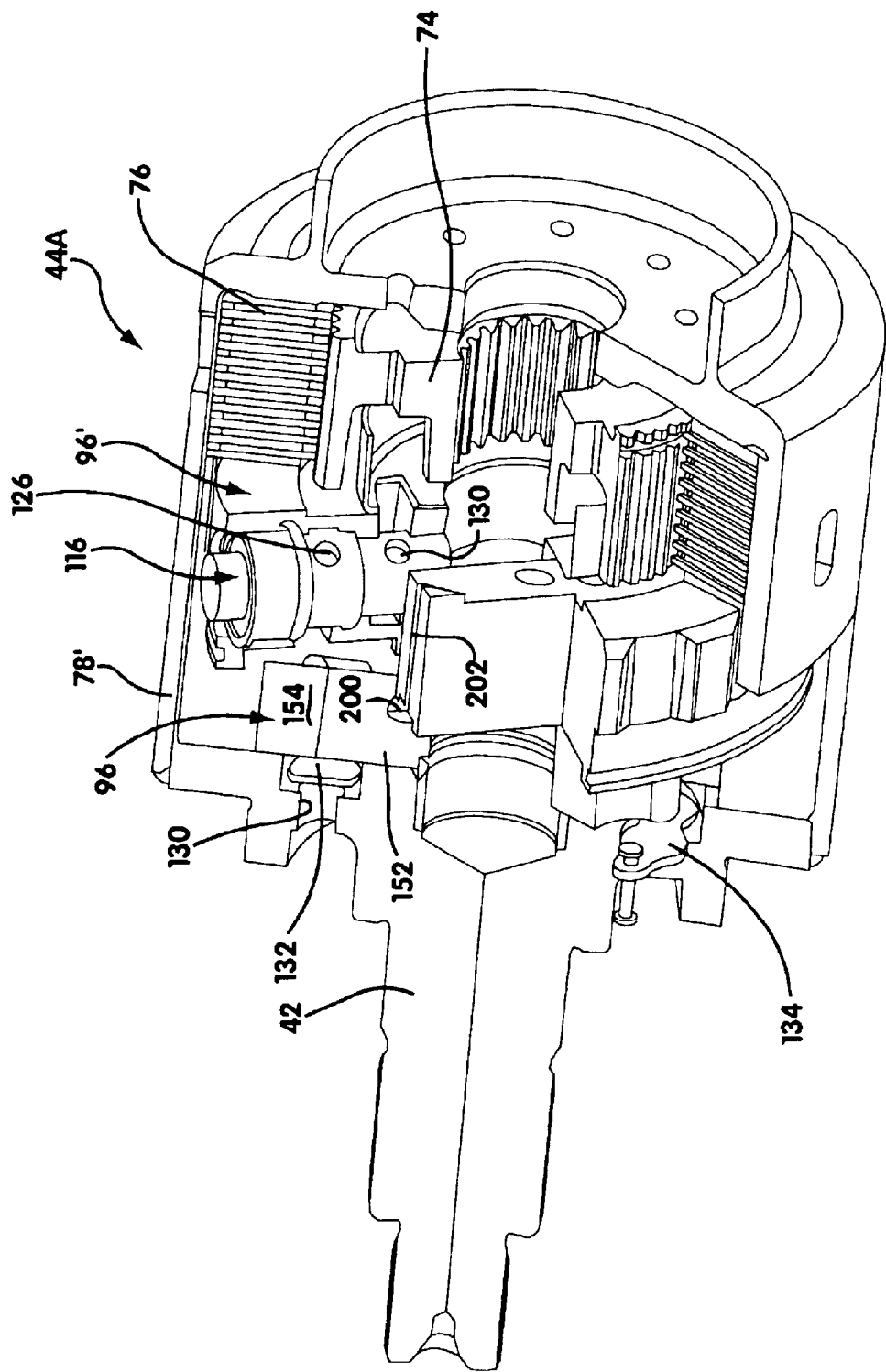

Referring primarily now to FIG. 6, the components of drive module 46 will be described. A drive pinion 220 is formed at the end of pinion shaft 54 and is meshed with a bevel ring gear 222 fixed via bolts 224 to a drive casing 226. An end cap 228 is also fixed via bolts 224 to drive casing 226 and is supported for rotation relative to housing 40 via a bearing assembly 230. A second end cap 232 is formed at the opposite end of drive casing 226 and is rotatably supported on housing 40 via a bearing assembly 234. Bevel gearset 56 includes a pair of pinion gears 236 rotatably supported on opposite ends of pinion shaft 238 that is non-rotatably fixed to drive casing 226 via a retainer screw 240. Gearset 56 further includes a first side gear 242 splined for rotation with first output shaft 58 and a second side gear 244 splined for rotation with second output shaft 60.

Second hydraulic clutch 62 includes a biasing clutch 246 and a clutch actuator 248. Biasing clutch 246 is a multi-plate clutch assembly having a clutch pack 250 of alternately interleaved inner and outer clutch plates that are respectively splined to a clutch hub 252 and drive casing 226. Hub 252 is splined to an axial hub section 254 of first side gear 242. Clutch actuator 248 includes a fluid pump 256 and a piston assembly 258. Pump 256 is a gerotor pump assembly disposed in a pump chamber formed between end cap 228 and a piston housing 260. An eccentric outer ring 262 of gerotor pump 256 and piston housing 260 are fixed for rotation with drive casing 226 via bolts 264. Piston assembly 258 is disposed in a piston chamber 266 formed in piston housing 260. In a preferred construction, piston assembly 258 is similar in structure and function to that of piston assembly 96 such that a control valve (not shown) similar to control valve 116 is used. As seen, seal rings 270 and 272 seal a piston 274 of piston assembly 258 relative to piston housing 260. Assuming that piston assembly 258 is similar to piston assembly 96, the hydraulic circuit shown in FIG. 5 would be applicable to illustrate the operation of second hydraulic coupling 62.

Pump 256 includes a pump ring 280 splined to first output shaft 68, and a stator ring 282 disposed between pump ring 280 and eccentric ring 262. The external lobes of pump ring 280 mesh with the internal lobes of stator ring 282, with stator ring 282 journalled in an eccentric aperture formed in eccentric rig 262. Relative rotation between drive casing 226 and first output shaft 58 generates a fluid pumping action. Check valves 132 are retained in inlet ports formed in end cap 228 while one-way check valves 134 are retained in flow passages formed in piston housing 260 between the outlet of pump 256 and piston chamber 266. A pressure regulator valve is mounted in a by-pass passage through piston 274 to control pressurization of piston chamber 266 so as to allow a limited amount of unrestrained inter-wheel speed differentiation, such as during turns.

This arrangement of an in-line hydraulic coupling between prop shaft 78 and pinion shaft 54 permits "on-demand" transfer of drive torque to secondary driveline 16. Thus, all-wheel drive traction control is provided when needed in response to a loss of traction between the front and rear drivelines. Combining the in-line coupling with second hydraulic coupling 62 in drive module 46 provides "front-to-back" and "side-to-side" traction control that is well suited for use in conjunction with a secondary driveline system.

Referring now to FIGS. 7 through 10, a modified version of first hydraulic coupling, identified by reference numeral 44A, is shown. Hydraulic coupling 44A is generally similar in structure and function to hydraulic coupling 44, with the exception that piston assembly 96A is now splined to drum 78A. However, the pump valving, operation of the bimetallic flow control valve and control valve 116 are substantially similar.

Figure 11:
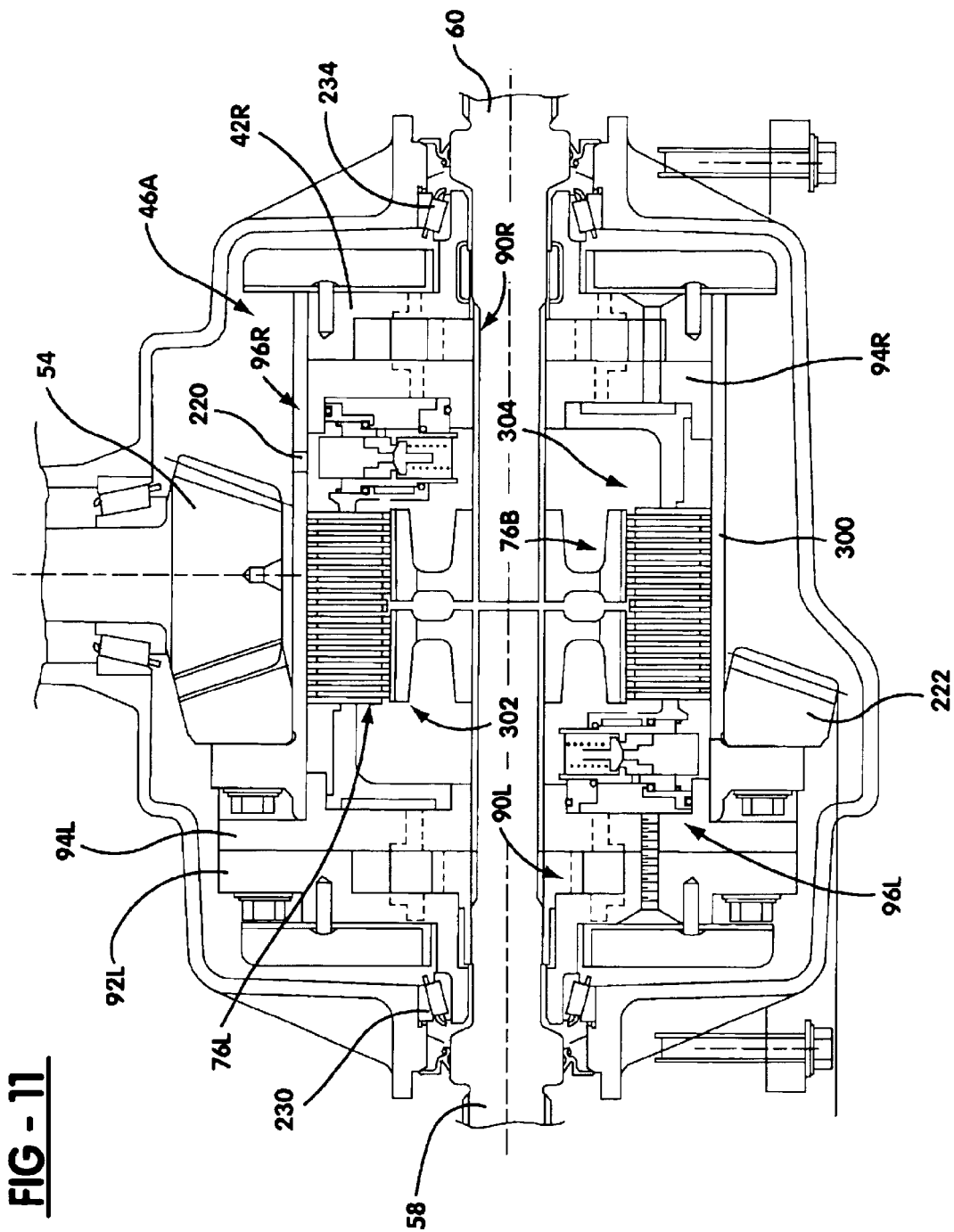
FIG. 11 is a modified drive module adapted for use with the secondary drive axle assembly.

Referring now to FIG. 11, a dual-clutch axle drive module 46' is shown which can be used in substitution for drive module 46. Drive module 46' includes a drive case 300 to which ring gear 222 is bolted, a first hydraulic clutch 302 connected between drive case 300 and first output shaft 58, and a second hydraulic clutch 304 connected between drive case 300 and second output shaft 60. Clutches 302 and 304 are both generally similar to hydraulic coupling 44 and respectively include clutch packs 76L and 76R, hydraulic pumps 90L and 90R, and piston assemblies 96L and 96L. The pumps are located between piston housings 94L and 94L and end caps 92L and 92R. Clutch 302 provides speed and torque control between drive case 300 and output shaft 58 while clutch 304 provides similar control between drive case 300 and output shaft 60. Thus, left-to-right (i.e., side-to-side) torque control and speed differentiation is provided.

Referring now to FIGS. 12 through 23, electronically-controlled versions of the passively-controlled hydraulic couplings previously described are shown in association with various torque transmission devices of the type used in vehicular applications. These electronically-controlled hydraulic couplings are superior to conventional coupling with motor-actuated clutch actuation systems in that they provide high efficiency and fast response with very low electrical power requirements.

Figure 12:
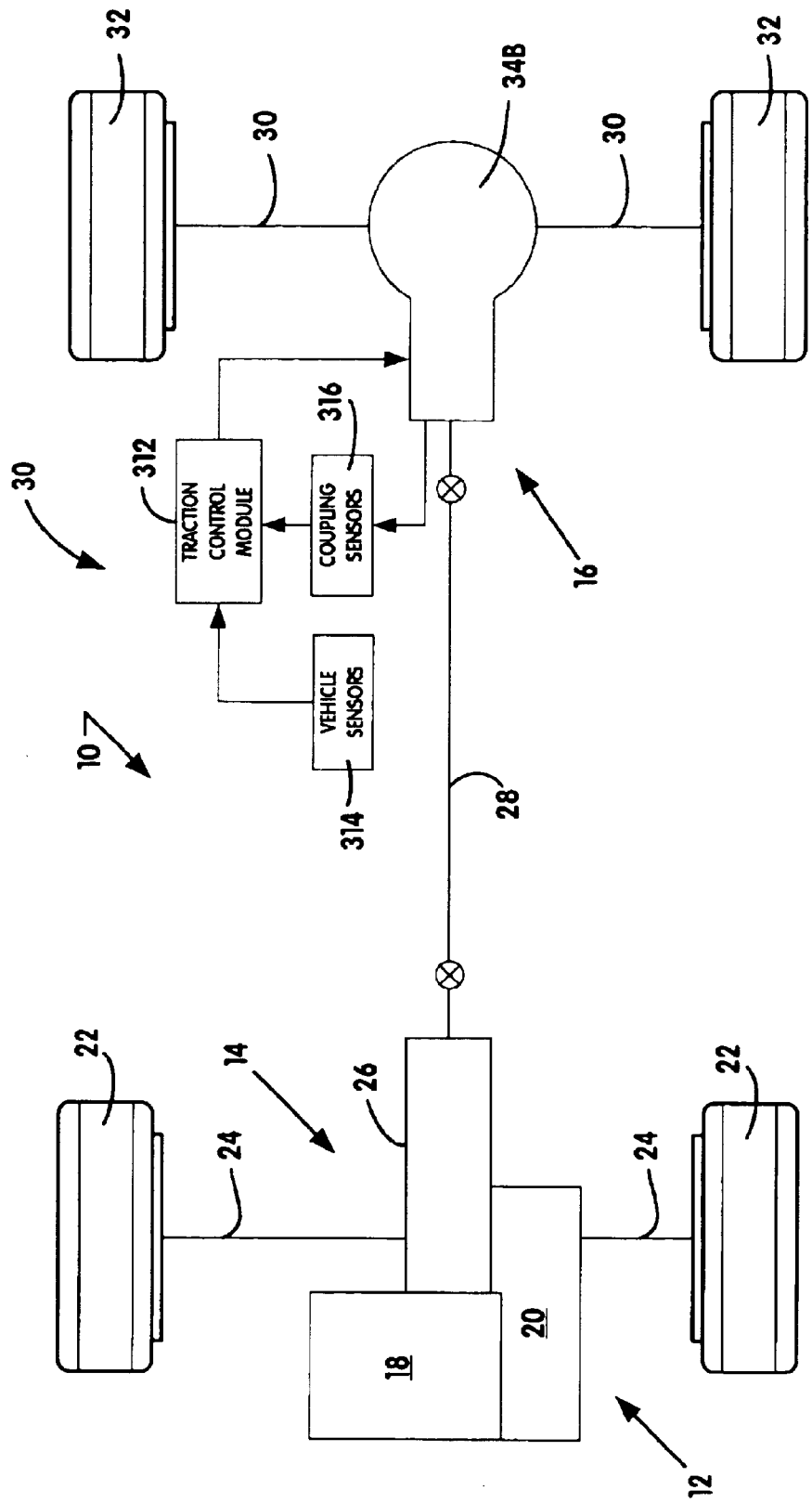
FIG. 12 is a modified version of the drivetrain schematic shown in FIG. 1 to illustrate incorporation of an electronically-controlled traction system with a secondary drive axle assembly.

As seen in FIG. 12, drivetrain 10 of FIG. 1 has been modified to include a traction control system 310 in association with a drive axle assembly 34B that is operable to adaptively control the transfer of drive torque from propshaft 28 to axleshafts 30. As will be detailed hereafter, drive axle assembly 34B is substantially similar to drive axle assembly 34 except that its hydraulic coupling has been modified to accommodate adaptive torque control in association with traction control system 310. Accordingly, like reference numbers will be used hereinafter to identify those components that are generally common to previously identified components of drive axle assembly 34.

In essence, drive axle assembly 34B includes a hydraulic coupling 44B that is operable to adaptively control the transfer of drive torque from input shaft 42B to pinion shaft 54B. As seen, pinion shaft 54B drives bevel-type differential gearset 56 associated with differential module 46B which is shown without a second hydraulic coupling. However, skilled artisans will appreciate that differential module 46 of FIG. 2 equipped with an on-demand passively-controlled second hydraulic coupling 62 could easily be used in association with drive axle assembly 34B to provide side-to-side bias control between axleshafts 30.

As will become apparent, hydraulic coupling 44B is controlled by electronic traction control module 312 for automatically controlling torque transfer and speed differentiation between input shaft 42B and pinion shaft 54B. Control module 312 monitors vehicle system information detected by vehicle sensors 314 and coupling operational information detected by coupling sensors 316. Coupling sensors 316 may include, but are not limited to, shaft speed sensors, clutch pressure, etc. Likewise, vehicle sensors 314 may include, but are not limited to, wheel speed sensors, brake status, transmission gear, vehicle speed sensor, etc. Control module 312 controls actuation of an electrically-actuated control valve 318 that is operable to regulate the fluid pressure generated by pump 90 and which is acting on piston assembly 96 within piston chamber 98 of hydraulic coupling 44B.

Figure 13:
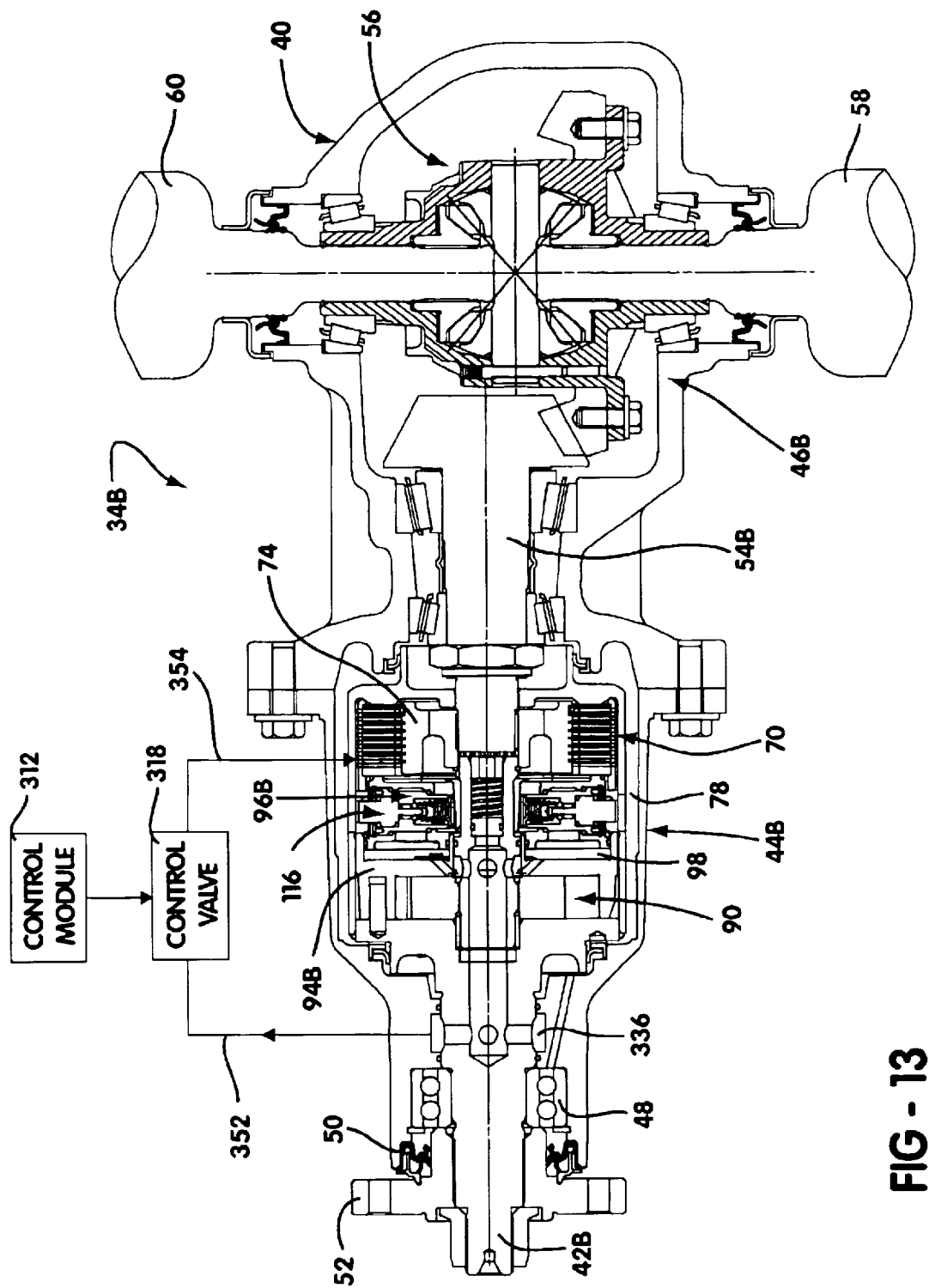
FIG. 13 is a sectional view of the secondary drive axle associated with the drivetrain of FIG. 13.
Figure 14:
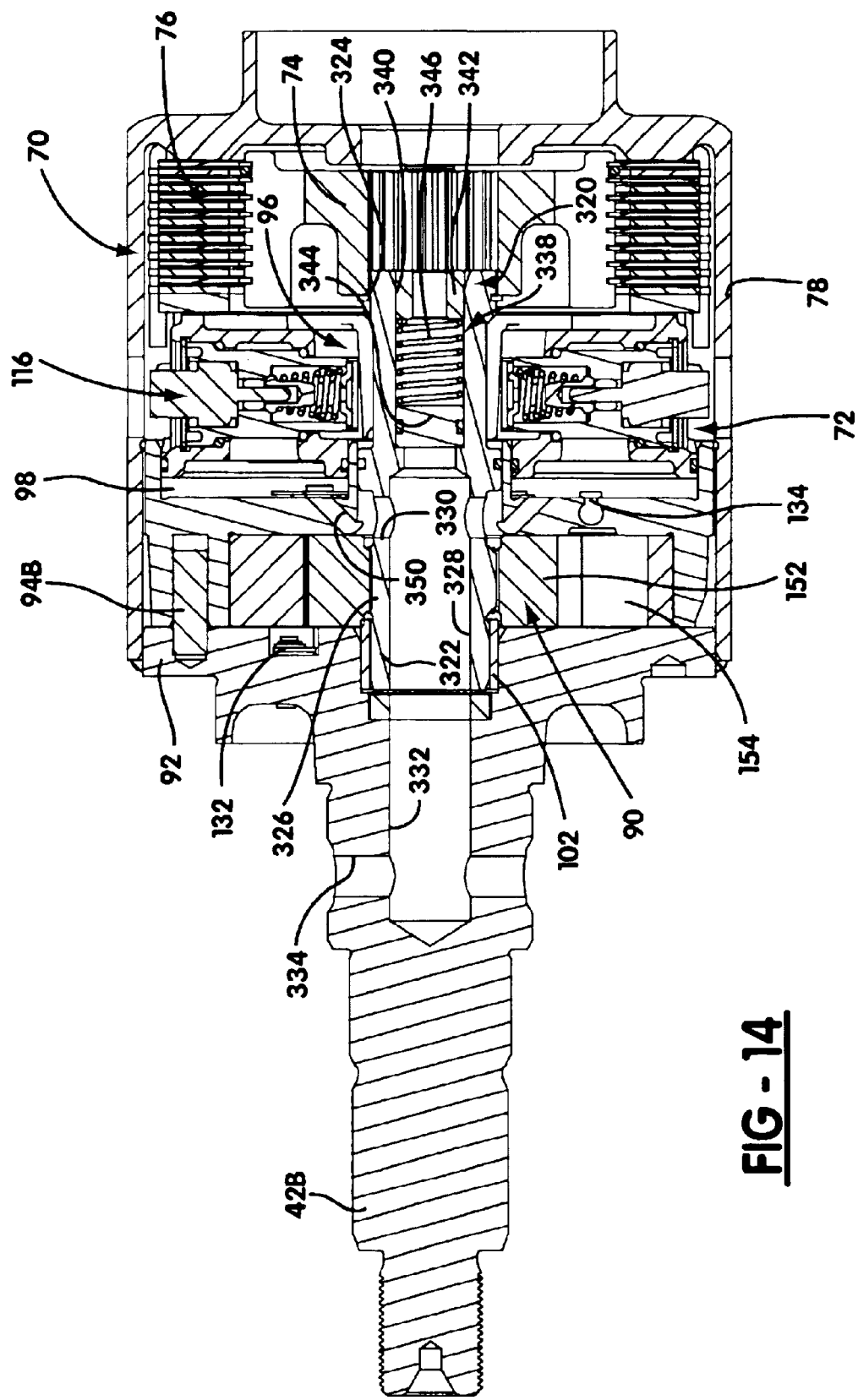
FIG. 14 is a sectional view of the hydraulic coupling associated with the secondary drive axle of FIG. 13.
Figure 15:
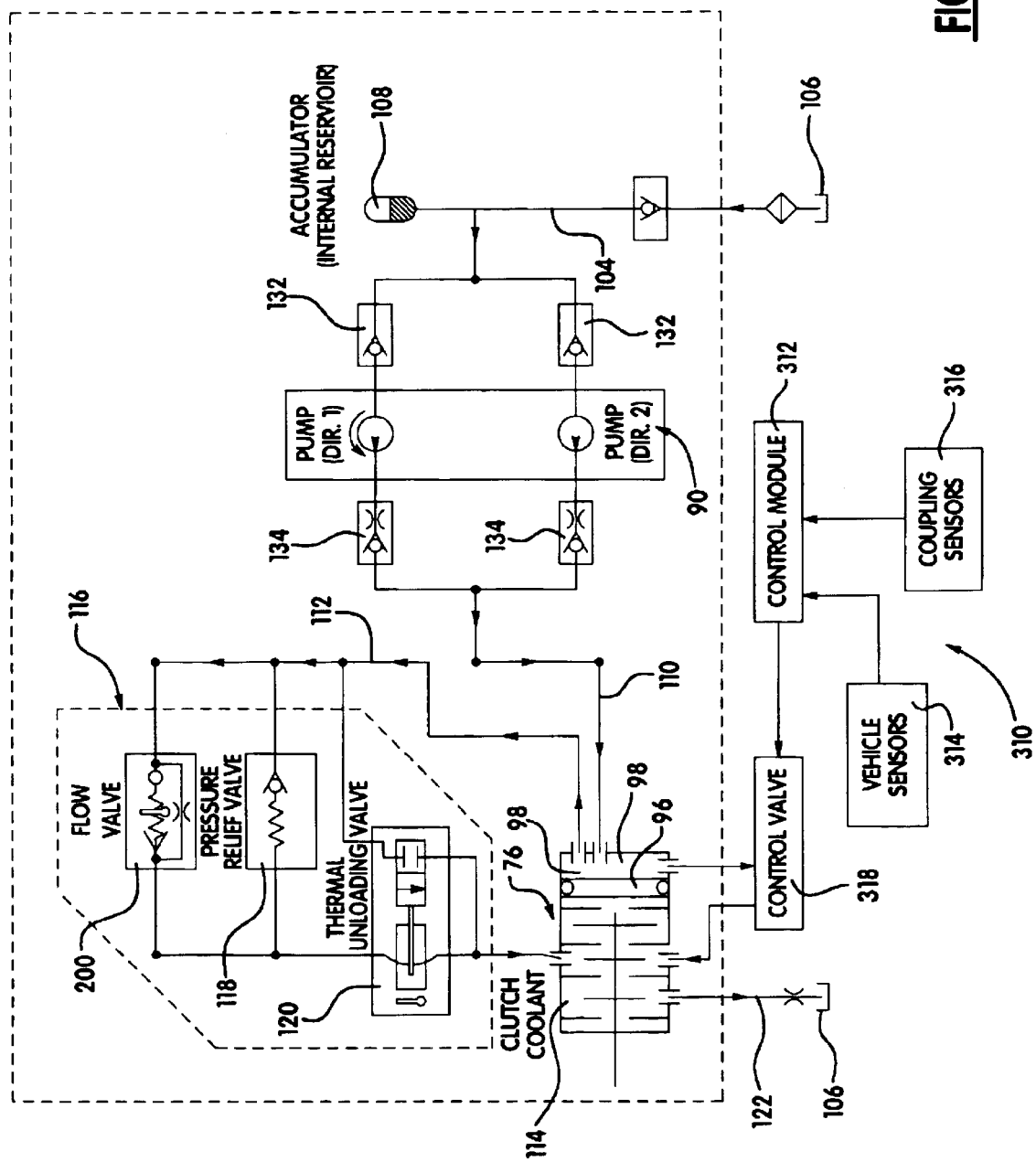
FIG. 15 is a schematic diagram illustrating the hydraulic control circuit associated with the hydraulic coupling shown in FIG. 14.

Referring primarily to FIGS. 13 and 14, the components of hydraulic coupling 44B modified to accommodate the active torque control feature will now be described in greater detail. In particular, a stub shaft assembly 320 is shown to be installed between pinion shaft 54B and input shaft 42B.

Stub shaft assembly 320 includes a pump shaft 322 having a first end rotatably supported by bearing assembly 102 in end plate 92 and a second end that is fixed via a spline connection 324 to hub 74 of transfer clutch 70. In addition, pump shaft 322 is fixed via a spline connection 326 for rotation with pump ring 152 of fluid pump 90. Accordingly, pump shaft 322 rotates in common with pinion shaft 54B due to its common connection with hub 74. Pump shaft 322 is formed to include a central bore 328 which communicates with a series of radial inlet ports 330. As seen, central bore 328 of pump shaft 322 is coaxially aligned with a blind bore 332 formed in input shaft 42B which, in turn, communicates with a series of radial outlet ports 334. Outlet ports 334 communicate with a circumferential control chamber 336 formed in a portion of housing 40 which surrounds input shaft 42B.

Stub shaft assembly 320 also includes an optional damper unit 338 installed in a bore 340 which is coaxial with central bore 328. Damper unit 338 includes a stop ring 342 press-fit in bore 340, a piston 344, and a biasing spring 346 disposed between piston 344 and stop ring 342. A face surface of piston 344 is exposed to the fluid pressure in central bore 328 which, in turn, is equal to the fluid pressure in piston chamber 98. Damper unit 338 is provided to dampen transient pressure spikes within the flow path.

Inlet ports 330 in pump shaft 322 are in fluid communication with piston chamber 98 via a series of flow channels 350 formed through piston housing 94B. Likewise, control chamber 336 is plumbed to be in fluid communication with an inlet side of control valve 318 via a control flow path 352 that is schematically shown in FIG. 13. Likewise, the outlet side of control valve 318 is plumbed to be in fluid communication with clutch chamber 114, as schematically illustrated by a return flow path 354. Control valve 318 receives electric control signals from control module 312 for controlling fluid flow from control flow path 352 to return flow path 354 which, in turn, controls the fluid pressure in piston chamber 98. Referring to FIG. 14, the arrows illustrate the fluid circuit connecting the high-pressure discharge side of fluid pump 90 with control flow path 352. As before, check valves 134 permit fluid discharged from pump 90 to enter piston chamber 98 while check valves 132 permit fluid from sump 106 to be drawn into the inlet side of pump 90.

In accordance with one embodiment, control valve 318 is a two position dump valve. In normal operation, such a dump-type control valve 318 would be maintained in its closed mode to prevent the venting of fluid from piston chamber 98. As such, all control of the torque transfer is provided by control valve 116 in the manner previously described. However, when it is desired to quickly release engagement of transfer clutch 70 by venting the fluid in piston chamber 98, dump valve 318 is shifted into its open mode to permit fluid to flow from control flow path 352 into return flow path 354. Such a "dump" feature permits use of passively-controlled on-demand hydraulic couplings in vehicles equipped with ABS brake systems. Thus, control module 312 would signal control valve 318 to shift into its open mode in response to a brake engage signal from the vehicle's brake system.

In accordance with a second embodiment, control valve 318 of FIG. 13 could be a throttle-type valve providing variable pressure control so as to adaptively control the engagement characteristics of transfer clutch. In such a variable control system, the quick dump feature would still be provided to again accommodate quick release of transfer clutch 70 during a braking situation. The adaptive pressure control is established by variably controlling flow through control valve 318 based on a control strategy incorporated in control module 312. Such control strategy functions to control variable actuation of control valve 318 in response to real-time vehicle operating characteristics, as detected by vehicle sensors 314. In addition, a viscosity compensation feature can be incorporated into the control strategy to accommodate changes in the fluid viscosity by use of a temperature sensor to measure the fluid temperature within the system. Such a temperature sensor would be generically classified as a coupling sensor 316.

Figure 16:
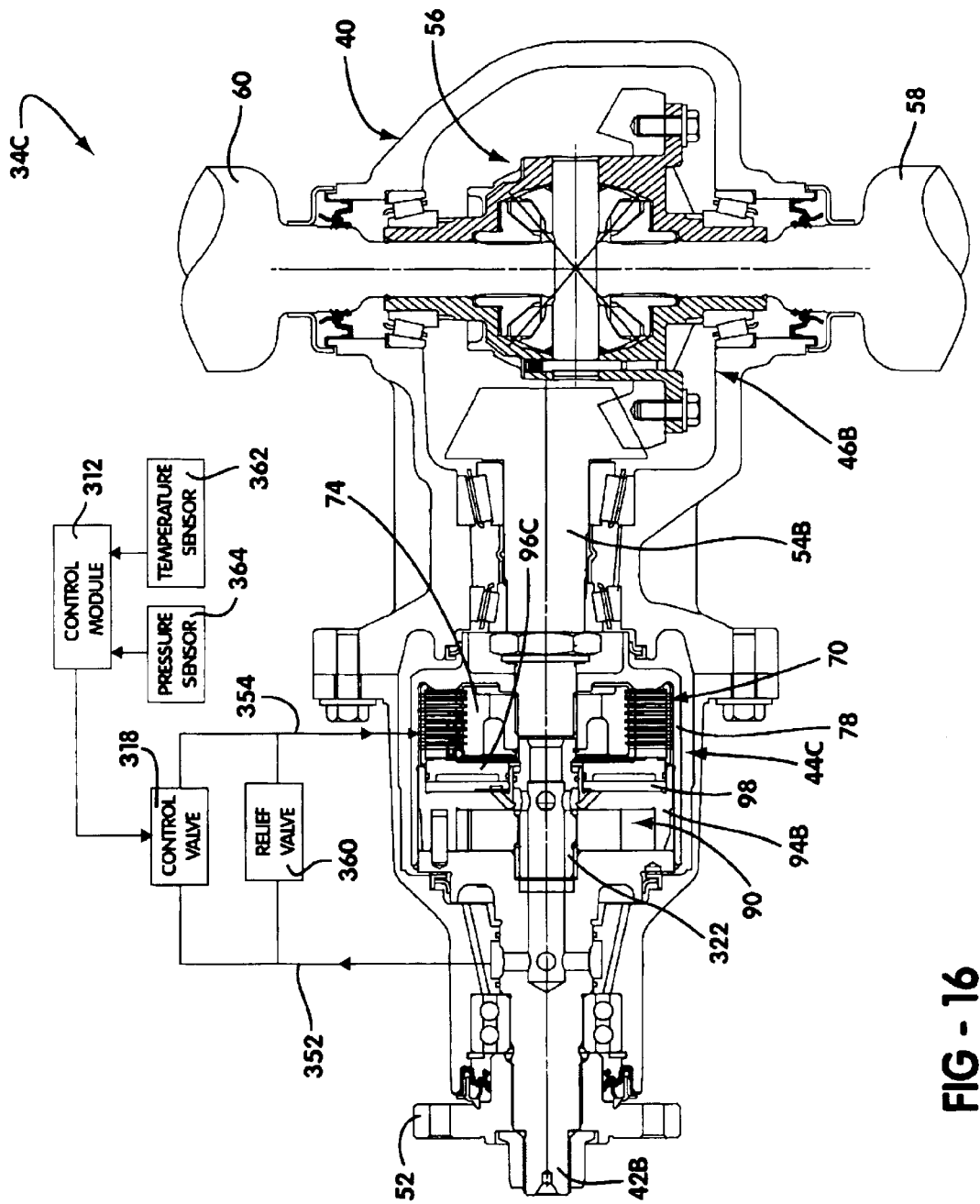
FIG. 16 is a sectional view, similar to FIG. 13, showing an alternative hydraulic control circuit for the hydraulic coupling.

Referring now to FIG. 16, an alternative embodiment of a drive axle assembly 34C is shown which is a modified version of drive axle assembly 34B shown in FIG. 13. In particular, hydraulic coupling 44C has been modified to remove control valve 116 from piston assembly 96C so as to provide a more compact arrangement. With the exception of hydraulic coupling 44C, the remaining components of drive axle assembly 34C are generally similar to those of drive axle assembly 34B. As seen, the same flow path exists between piston chamber 98 and control flow path 352 as was described in detail for electronically-controlled hydraulic coupling 44B of FIG. 13.

To accommodate the pressure relief feature previously provided by control valve 116, a pressure relief valve 360 is located in the fluid circuit between control flow path 352 and return flow path 354. Likewise, the over-temperature feature is now provided by control module 312 shifting control valve 318 into its open mode for dumping the fluid pressure in piston chamber 98 when the fluid temperature detected by temperature sensor 362 exceeds a predetermined value. As an option to the use of pressure relief valve 360, a pressure sensor 364 could be used to signal control module 312 to actuate control valve 318 to reduce the fluid pressure in piston chamber 98 when an over-pressure condition in control flow path 352 is detected.

Figure 17:
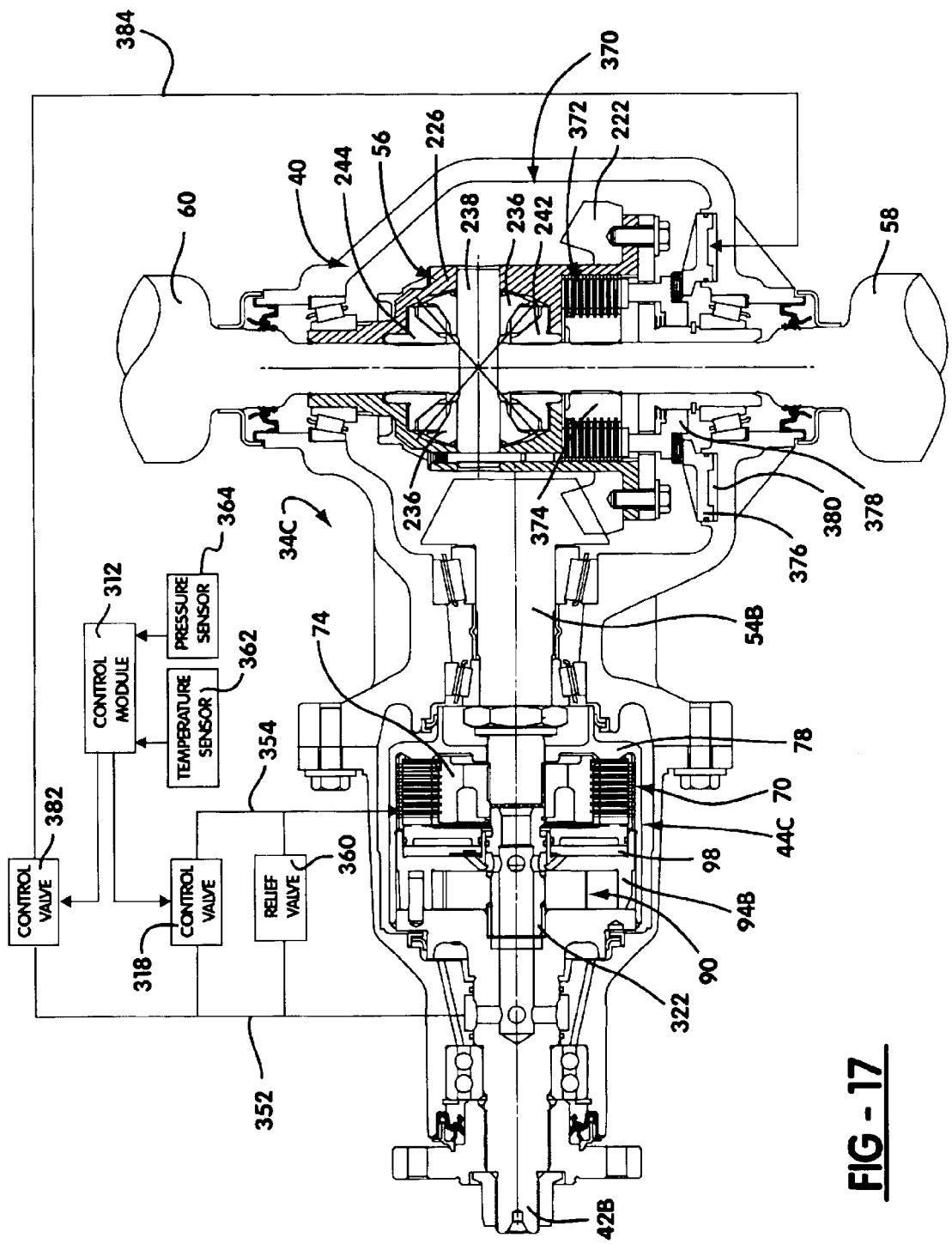
FIG. 17 is a sectional view of an alternative embodiment for the secondary drive axle assembly of the present invention.

Referring to FIG. 17, drive axle assembly 34C is now shown to include a second hydraulic coupling 370 in association with differential unit 56 of drive module 46C. Hydraulic coupling 370 includes a multi-plate friction clutch pack 372 operably installed between drive case 226 of differential 56 and a hub 374 fixed to axleshaft 58. A clutch actuation mechanism includes a piston 376 that is operable to axially displace a thrust ring 378 for exerting a clutch engagement force on clutch pack 372. Piston 376 is slidably disposed in a piston chamber 380 formed in housing 40. A second control valve 382 has an inlet in communication with control flow path 352 and an outlet in communication with piston chamber 380 via a supply flow path 384. Control valve 382 is functional to control the fluid pressure delivered to piston chamber 380 for controlling intra-axle slip between axleshafts 58 and 60 to provide side-to-side slip and torque bias control. As seen, control module 312 also controls actuation of second control valve 382.

Figure 18:
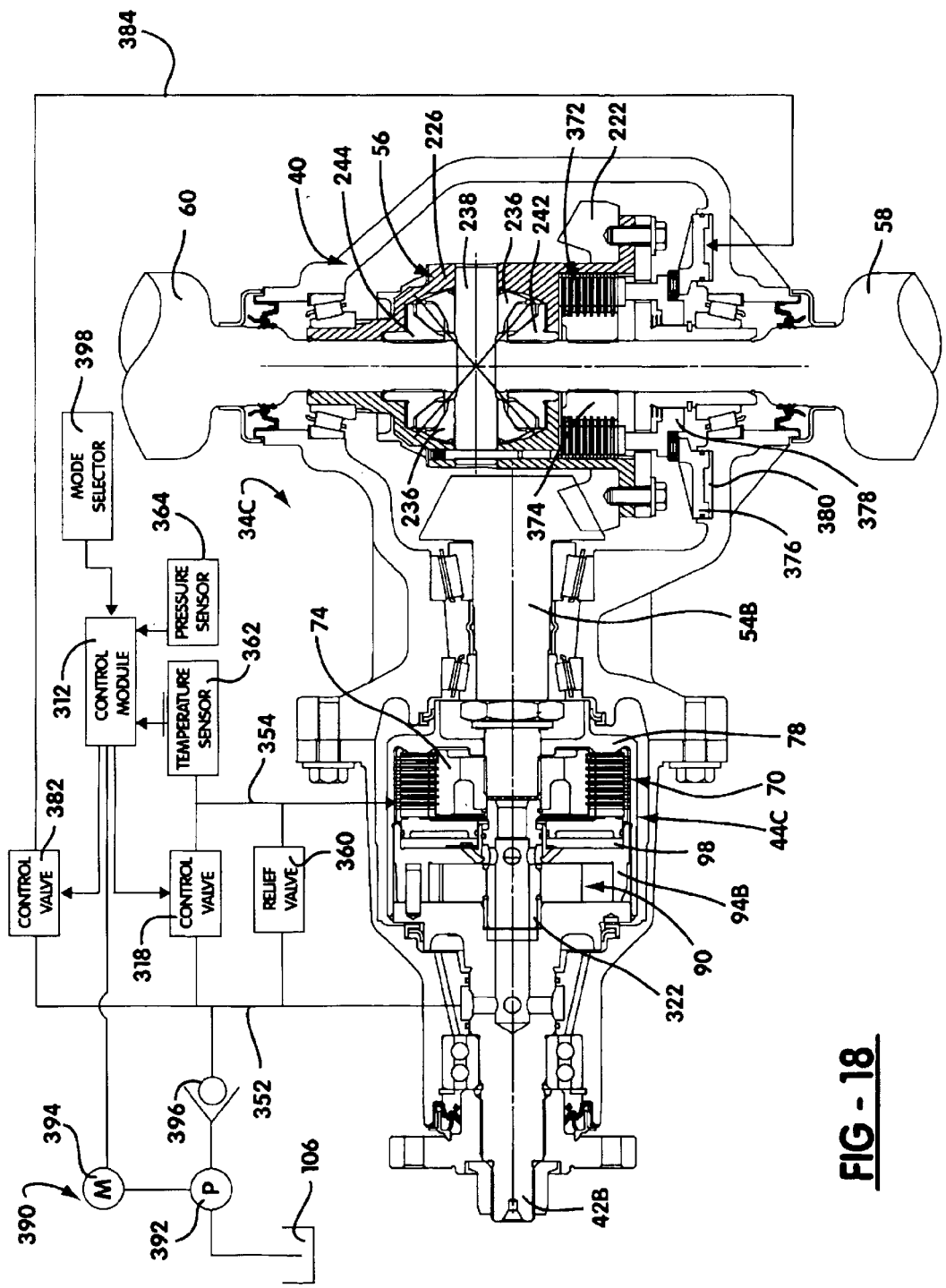
FIG. 18 is a sectional view of a modified hydraulic control system for the secondary drive axle shown in FIG. 17.

An alternative hydraulic circuit for the drive axle assembly shown in FIG. 17 is shown in FIG. 18 to include a supplemental pressure system 390 in fluid communication with control flow path 352. In particular, a fluid pump 392 driven by an electric motor 394 draws fluid from sump 106 and delivers fluid to control flow path 352 through a one-way check valve 396. This arrangement permits a preemptive locking feature since additional fluid pressure can now be delivered to piston chamber 98 for engaging transfer clutch 70 regardless of the pumping activity of pump 90. Obviously, either or both of control valves 318 and 382 can be actuated utilizing fluid pressure from supplemental pressure system 390 to control the front-to-rear and/or side-to-side torque transmission characteristics. Motor 396 is controlled by control module 312. A mode selector 398 permits selection by the vehicle operator of one of an "AUTO" drive mode and a "LOCK" drive mode. IN the AUTO drive mode, adaptive control is automatic based on the control strategy. In contrast, selection of the LOCK drive mode results in actuation of supplemental pressure system 390 for fully engaging transfer clutch 70 and, if required, bias clutch 372. It will be appreciated that a hydraulic circuit with the supplemental pressure system and mode select features could also be used with any of the drive axle arrangements shown in FIGS. 13 through 17.

The hydraulic control system associated with the electronically-controlled hydraulic couplings of the present invention provide a number of advantages. First, pump 90 is never starved nor is there any potential for loss of its prime. Next, the system allows for continuous lubrication of the components with no risk of cavitation. Furthermore, the controls and sensors can be located remotely, or in association with the drive axle assembly, in a common control body assembly. For example, the sensors (pressure and temperature) can be located in close proximity to the control valves and the control module.

Figure 19:
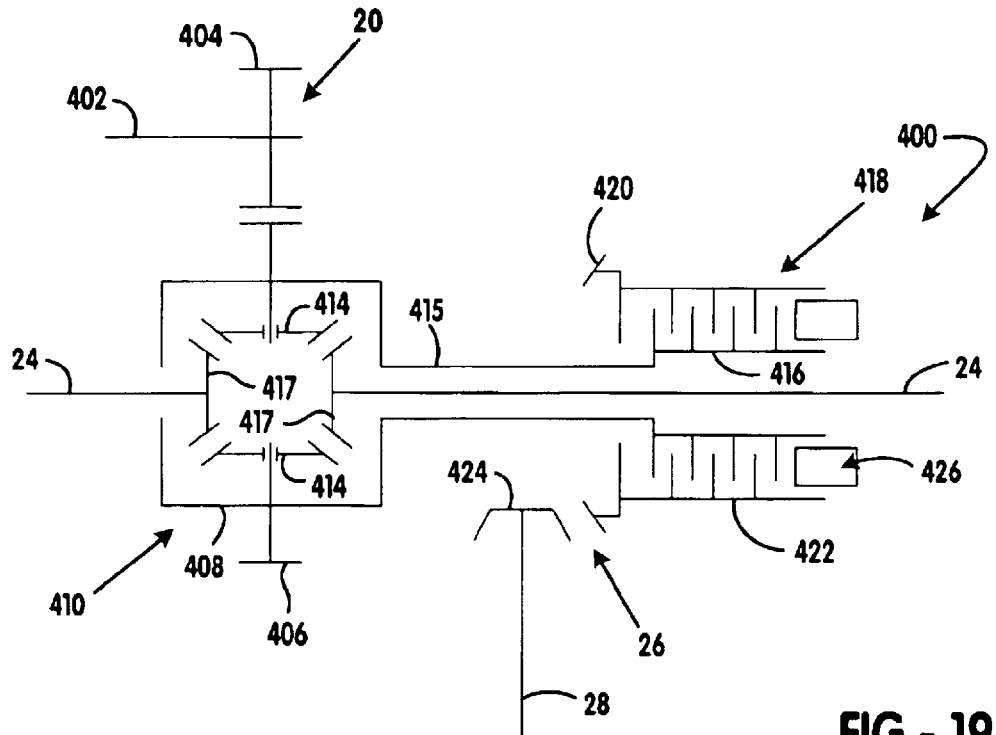

Referring now to FIG. 19, an electronically-controlled hydraulically coupling 400 is now schematically illustrated in association with an on-demand four-wheel drive system based on a front-wheel drive vehicle similar to that shown in FIG. 12. In particular, an output shaft 402 of transaxle 20 is shown to drive an output gear 404 which, in turn, drives an input gear 406 fixed to a carrier 408 associated with front differential unit 410. To provide drive torque to front wheels 22, front differential unit 410 includes a pair of side gears 412 that are connected to front wheels 22 via axleshafts 24. Differential unit 410 also includes pinions 412 that are rotatably supported on pinion shafts fixed to carrier 408 and which are meshed with side gears 412. A transfer shaft 415 is provided to transfer drive torque from carrier 408 to a clutch hub 416 associated with a multi-pate clutch assembly 418.

Transfer unit 26 is a right-angled drive mechanism including a ring gear 420 fixed for rotation with a drum 422 of clutch assembly 418 which is meshed with a pinion gear 424 fixed for rotation with propshaft 18. As seen, clutch actuator mechanism 426 is schematically illustrated for controlling actuation of clutch assembly 418. It is to be understood that clutch actuator assembly 426 is contemplated to be similar to the electronically-controlled system shown and described in relation to FIGS. 12 through 16. In particular, clutch actuation mechanism 426 is intended to represent the hydro-mechanical components (i.e., fluid path 352, control valve 318), and control system (i.e., module 312, sensors 362, 364) required to adaptive control hydraulic coupling 400.

Figure 20:
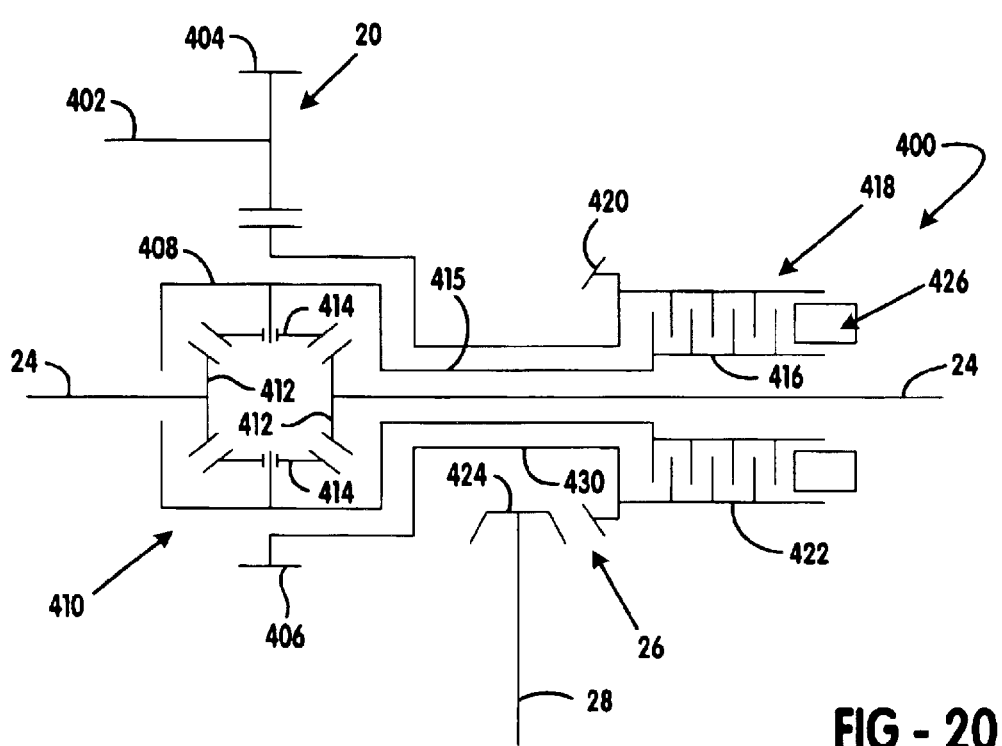

FIG. 20 illustrates a modified version of FIG. 19 wherein an on-demand four-wheel drive system is now shown based on a rear-wheel drive motor vehicle that is arranged to normally deliver drive torque to rear wheels 32 while selectively transmitting drive torque to front wheels 24 through hydraulic coupling 400. In this arrangement, drive torque is transmitted directly from transmission output shaft 402 to transfer unit 26 via a drive shaft 430 interconnecting input gear 406 to ring gear 420. To provide drive torque to front wheels 24, torque coupling 400 is shown operably disposed between drive shaft 430 and transfer shaft 415. In particular, clutch assembly 418 is arranged such that drum 422 is driven with ring gear 420 by drive shaft 430. As such, actuation of clutch actuator 426 functions to transfer torque from drum 422 through the clutch pack to hub 416 which, in turn, drives carrier 408 of front differential unit 410 via transfer shaft 315.

Figure 21:
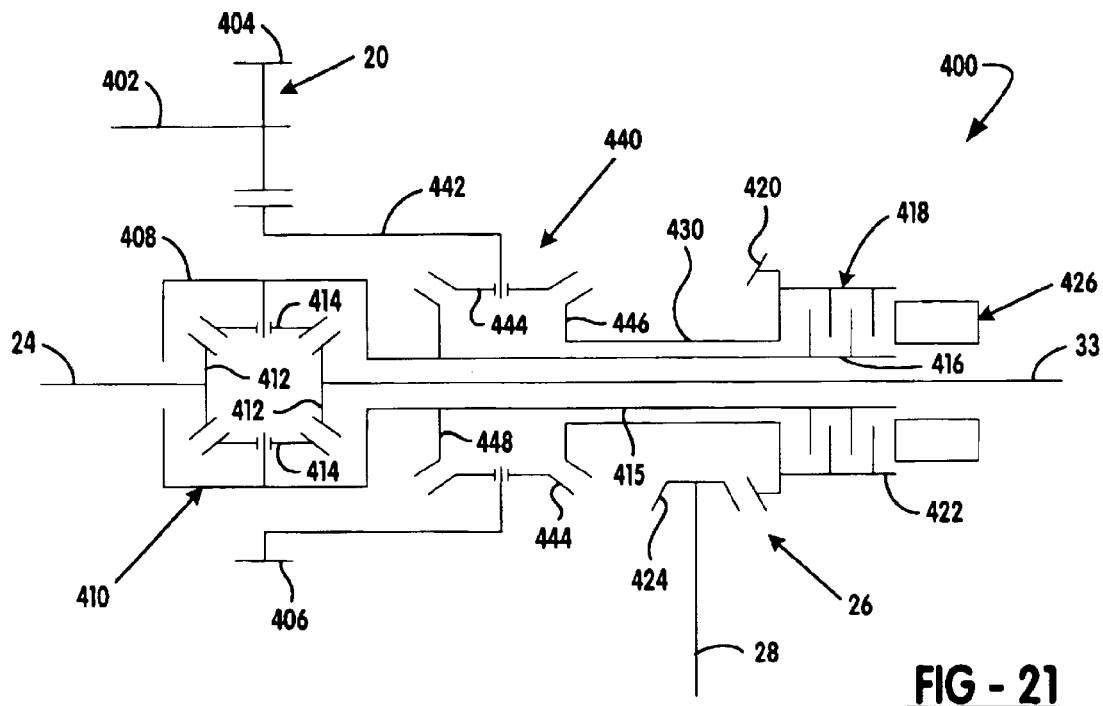

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 21 schematically illustrates a full-time four-wheel drive system which is generally similar to the on-demand four-wheel drive system shown in FIG. 20 with the exception that an interaxle differential unit 440 is now operably installed between carrier 408 of front differential unit 410 and transfer shaft 415. In particular, output gear 406 is fixed for rotation with a carrier 442 of interaxle differential 440 from which pinion gears 444 are rotatably supported. A first side gear 446 is meshed with pinion gears 444 and is fixed for rotation with drive shaft 430 so as to be drivingly interconnected to the rear driveline through transfer unit 26. Likewise, a second side gear 448 is meshed with pinion gears 444 and is fixed for rotation with carrier 408 of front differential unit 410 so as to be drivingly interconnected to the front driveline. Torque transfer mechanism 400 is now shown to be operably disposed between side gears 446 and 448. As such, torque transfer mechanism 400 is operably arranged between the driven outputs of interaxle differential 440 for providing a torque biasing and slip limiting function. Torque transfer mechanism 400 is shown to again include multi-plate clutch assembly 418 and clutch actuator assembly 426. Clutch assembly 418 is operably arranged between transfer shaft 415 and driveshaft 430. In operation, when the sensor detects a vehicle operating condition, such as excessive interaxle slip, control module 312 adaptively controls actuation control valve 315 associated with clutch actuator assembly 426 for controlling engagement of clutch assembly 418 and thus the torque biasing between the front and rear driveline.

Figure 22:
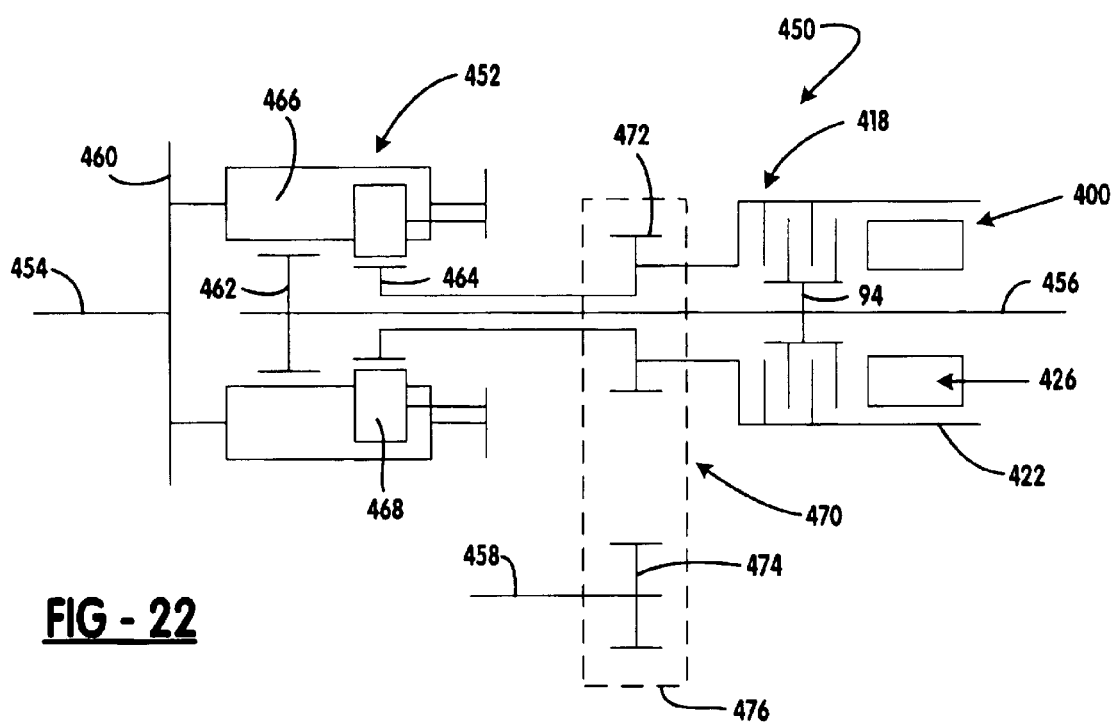

Referring now to FIG. 22, a full-time 4WD system is shown to include a transfer case 450 equipped with an interaxle differential 452 between an input shaft 454 and output shafts 456 and 458. Differential 452 includes an input defined as a planet carrier 460, a first output defined as a first sun gear 462, a second output defined as a second sun gear 464, and a gearset for permitting speed differentiation between first and second sun gears 462 and 464. The gearset includes meshed pairs of first planet gears 466 and second pinions 468 which are rotatably supported by carrier 460. First planet gears 466 are shown to mesh with first sun gear 462 while second planet gears 468 are meshed with second sun gear 464. First sun gear 462 is fixed for rotation with rear output shaft 456 so as to transmit drive torque to the rear driveline. To transmit drive torque to the front driveline, second sun gear 464 is coupled to a transfer assembly 470 which includes a first sprocket 472 rotatably supported on rear output shaft 456, a second sprocket 74 fixed to front output shaft 458, and a power chain 476. Transfer case 450 further includes hydraulic coupling 400 having a multi-plate clutch assembly 418 and a clutch actuator mechanism 426. Again, clutch actuator mechanism 426 is only schematically shown but is intended to be substantially similar to that disclosed previously.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle assembly for use in a motor vehicle to transfer drive torque from a powertrain to a pair of wheels, comprising:

a hydromechanical coupling having an input shaft driven by the powertrain, a pinion shaft, a transfer clutch disposed in a clutch chamber between said input shaft and said pinion shaft, a piston disposed in a piston chamber and actuatable to engage said transfer clutch for transferring drive torque from said input shaft to said pinion shaft, a fluid pump for pumping hydraulic fluid from a sump to said piston chamber in response to relative rotation between said input shaft and said pinion shaft, and a first control valve mounted to said piston, said control valve operable to vent fluid from said piston chamber to said sump in response to the occurrence of either of an over-pressure and an over-temperature condition;

first and second output shafts adapted for connection to the pair of wheels;

a differential assembly including a casing driven by said pinion shaft and a gearset interconnecting said casing to said first and second output shafts;

a fluid control system including a first flow path communicating with said piston chamber, a second flow path communicating with said clutch chamber, and a second control valve operable in a first mode to prevent fluid flow from said first flow path to said second flow path and in a second mode to permit fluid flow from said first flow path to said second flow path; and a traction control system including sensors for detecting operating characteristics of the motor vehicle and a control module for receiving sensor signals from said sensors and controlling actuation of said second control valve in response thereto.

2. The drive axle of claim 1 wherein said hydromechanical coupling includes a first flow passage for supplying hydraulic fluid from said sump to an inlet of said pump, a second flow passage for supplying hydraulic fluid from an outlet of said pump to said piston chamber, and a third flow passage through said piston for venting fluid from said piston chamber to said sump, and wherein said first control valve is located in said third flow passage.

3. The drive axle of claim 1 wherein said hydraulic coupling further includes a piston housing providing a one-way flow passage from an outlet of said pump to said piston chamber, and wherein said first flow path includes a first fluid port through said piston housing in fluid communication with a central bore in said pinion shaft, a second fluid port through said input shaft in fluid communication with said central bore, and a fluid coupling between said second fluid port and an inlet of said second control valve.

4. The drive axle of claim 1 wherein said second control valve is a dump valve operable in its first mode to maintain fluid pressure in said piston chamber and in its second mode to release fluid pressure in said piston chamber for releasing engagement of said transfer clutch.

5. The drive axle of claim 1 wherein said second control valve can be controlled so as to define a variable second mode for adaptively regulating the fluid pressure in said piston chamber.

6. The drive axle of claim 1 wherein said hydromechanical coupling further includes a pump shaft coaxially positioned between said input shaft and said pinion shaft, said pump shaft coupled to a first component of said pump and said input shaft coupled to a second component of said pump such that said pump provides a fluid pumping action in response to relative rotation therebetween, said pump shaft being coupled for common rotation with said pinion shaft.

7. The drive axle of claim 1 further comprising:

a second pump for pumping hydraulic fluid from said sump into said first flow path; and a motor for driving said second pump, said control module operable to control actuation of said motor.

8. The drive axle of claim 1 further comprising:

a second hydromechanical coupling having a second transfer clutch operably disposed between said casing and one of said first and second output shafts, a second piston disposed in a second piston chamber which is actuatable in response to fluid pressure in said second piston chamber to engage said second transfer clutch; and a third control valve operable for controlling fluid communication between said first flow path and said second piston chamber, said control module operable to control actuation of said third control valve.

9. A drive axle assembly for use in a motor vehicle to transfer drive torque from a powertrain to a pair of wheels, comprising:

a hydromechanical coupling having an input shaft driven by the powertrain, a pinion shaft, a transfer clutch disposed in a clutch chamber between said input shaft and said pinion shaft, a piston disposed in a piston chamber and actuatable to engage said transfer clutch for transferring drive torque from said input shaft to said pinion shaft a fluid pump for pumping hydraulic fluid from a sump to said piston chamber in response to relative rotation between said input shaft and said pinion shaft;

first and second output shafts adapted for connection to the pair of wheels;

a differential assembly including a casing driven by said pinion shaft and a gearset interconnecting said casing to said first and second output shafts;

a primary fluid control system including a first flow path communicating with said piston chamber, a second flow path communicating with said clutch chamber, and a control valve operable in a first mode to prevent fluid flow from said first flow path to said second flow path and in a second mode to permit fluid flow from said first flow path to said second flow path;

a secondary fluid control system including a second pump operable for pumping fluid from said sump into said first flow path and an electric motor for controlling the fluid pressure generated by said second pump; and a traction control system including sensors for detecting operating characteristics of the motor vehicle and a control module for receiving signals from said sensors and controlling actuation of said control valve and said electric motor in response thereto.

10. The drive axle of claim 9 wherein said hydraulic coupling further includes a piston housing providing a one-way flow passage from an outlet of said pump to said piston chamber, and wherein said first flow path includes a first fluid port through said piston housing in fluid communication with a central bore in said pinion shaft, a second fluid port through said input shaft in communication with said central bore, and a fluid coupling between said second fluid port and an inlet of said control valve.

11. The drive axle of claim 9 wherein said control valve is a dump valve operable in its first mode to maintain fluid pressure in said piston chamber and in its second mode to release fluid pressure in said piston chamber for releasing engagement of said transfer clutch.

12. The drive axle of claim 9 wherein said control valve can be controlled so as to define a variable second mode for regulating the fluid pressure in said piston chamber.

13. The drive axle of claim 9 wherein said hydromechanical coupling further includes a pump shaft coaxially positioned between said input shaft and said pinion shaft, said pump shaft coupled to a first component of said pump and said input shaft coupled to a second component of said pump such that said pump provides a fluid pumping action in response to relative rotation therebetween, said pump shaft being coupled for common rotation with said pinion shaft.

14. The drive axle of claim 9 further comprising:
   a second hydromechanical coupling having a second transfer clutch operably disposed between said casing and one of said first and second output shafts, a second piston disposed in a second piston chamber which is actuatable in response to fluid pressure in said second piston chamber to engage said second transfer clutch; and
   a second control valve operable for controlling fluid communication between said first flow path and said second piston chamber, said second control valve being actuated by said control module.

15. A hydraulic coupling for transferring drive torque from a power source to an output member, comprising:
   an input shaft driven by the power source and having a first flow passage;
   an output shaft driving the output member;
   an intermediate shaft disposed between said input shaft and said output shaft, said intermediate shaft having a second flow passage in communication with said first flow passage;
   a piston housing driven by said input shaft and defining a pump chamber and a piston chamber, said piston housing having a third flow passage in communication with said second flow passage;
   a fluid pump disposed in said pump chamber and having a first component driven by said intermediate shaft and a second component driven by said piston housing such that relative rotation therebetween causes said fluid pump to pump hydraulic fluid from a sump to said piston chamber;
   a transfer clutch including a drum fixed for rotation with said input shaft, a hub coupling said intermediate shaft to said output shaft, and a clutch pack operably disposed between said drum and said hub;
   a piston disposed in said piston chamber and moveable to engage said clutch pack in response to the fluid pressure in said piston chamber;
   a control valve having an inlet in fluid communication with said first flow passage and an outlet in fluid communication with a fourth flow passage supplying fluid to lubricate and cool said clutch pack;
   a pressure relief valve operable to vent fluid from said first flow passage to said fourth flow passage when the fluid pressure in said piston chamber exceeds a predefined pressure value; and
   a traction control system for determining a speed difference between said input shaft and said output shaft and controlling actuation of said control valve in response thereto.

16. A drive axle for use in a motor vehicle to transfer drive torque from a powertrain to a pair of wheels, comprising:
   a housing;
   an input shaft rotatably supported within said housing and adapted to be driven by the powertrain;
   a torque transmission mechanism supported by said housing and driven by said input shaft, said torque transmission mechanism comprising a first transfer clutch operably interconnecting said input shaft and a pinion shaft, a first piston selectively moveable in a first piston chamber to engage said first transfer clutch, and a pump for selectively pumping hydraulic fluid to said first piston chamber for actuating said first piston;
   a differential assembly supported within said housing, and including a drive case rotatably driven by said pinion shaft, first and second output shafts driven by said drive case and adapted for connection to the wheels, a second transfer clutch operably disposed between said drive case and said first output shaft, and a second piston moveable in a second piston chamber to engage said second transfer clutch for limiting relative rotation between said drive case and said first output shaft; and
   a fluid control system having a control flow path in communication with said first piston chamber, a return flow path in communication with said first transfer clutch, a supply flow path in communication with said second piston chamber, a first electric control valve for selectively venting fluid from said control flow path to said return flow path, a second electric control valve for selectively venting fluid from said control flow path to said supply flow path, a third control valve for selectively venting fluid from said first piston chamber to a sump, and a traction control module to control actuation of said first and second control valves.

17. The drive axle of claim 16 wherein said third control valve is operable to vent fluid from said first piston chamber to a said sump in response to the fluid pressure in said first piston chamber exceeding a predetermined pressure value.

18. The drive axle of claim 17 wherein said third control valve comprises a pressure relief valve biased to a first position and wherein said pressure relief valve moves to a second position for relieving said over-pressure condition.

19. The drive axle of claim 16 wherein said first control valve is a dump valve operable in its first mode to maintain fluid pressure in said first piston chamber and in its second mode to release fluid pressure in said first piston chamber for releasing engagement of said first transfer clutch.

20. The drive axle of claim 16 wherein said first control valve can be controlled so as to define a variable second mode for regulating the fluid pressure in said first piston chamber.

21. The drive axle of claim 16 further comprising:
   a second pump for pumping hydraulic fluid from said sump into said control flow path; and
   a motor for driving said second pump, said motor being actuated by said control module.

* * * * *